United States Patent
Zahir Azami et al.

(10) Patent No.: US 7,369,490 B2
(45) Date of Patent: May 6, 2008

(54) METHOD AND APPARATUS FOR CALL EVENT PROCESSING IN A MULTIPLE PROCESSOR CALL PROCESSING SYSTEM

(75) Inventors: Seyed Bahram Zahir Azami, Ottawa (CA); Mendel Elliott Spencer, Ottawa (CA)

(73) Assignee: Alcatel Lucent, Paris (FR)

( * ) Notice: Subject to any disclaimer, the term of this patent is extended or adjusted under 35 U.S.C. 154(b) by 944 days.

(21) Appl. No.: 10/186,877

(22) Filed: Jun. 28, 2002

(65) Prior Publication Data
US 2004/0047289 A1  Mar. 11, 2004

(51) Int. Cl.
H04L 12/26 (2006.01)
H04L 12/56 (2006.01)
G06F 15/18 (2006.01)

(52) U.S. Cl. .................. 370/230; 370/395.2; 706/2; 706/8; 706/9

(58) Field of Classification Search ............ None
See application file for complete search history.

(56) References Cited

U.S. PATENT DOCUMENTS

| | | | |
|---|---|---|---|
| 5,521,971 A | | 5/1996 | Key et al. |
| 5,751,691 A | * | 5/1998 | Soumiya et al. ........ 370/395.21 |
| 5,787,161 A | | 7/1998 | Rayes et al. |
| 5,812,526 A | * | 9/1998 | Chang et al. ................ 370/230 |
| 6,067,287 A | * | 5/2000 | Chung-Ju et al. ........... 370/232 |
| 6,084,955 A | | 7/2000 | Key et al. |
| 2003/0198203 A1 | | 10/2003 | Antonio et al. |
| 2004/0042455 A1 | * | 3/2004 | Wallenius ................... 370/392 |
| 2004/0047289 A1 | | 3/2004 | Azami et al. |

OTHER PUBLICATIONS

Chung-Ju Chnag, Traffic control in an ATM network using fuzzy set theory, 1994, IEEE, pp. 1200-1207.*
R. G. Cheng, Neural network connection admission control for ATM networks, Apr. 1997, IEEE, pp. 93-98.*
Branson, Jerry S. and John H. Lilly, *IEEE Transactions on Fuzzy Systems*, vol. 9, No. 2, "Incorporation, Characterization, and Conversion of Negative Rules into Fuzzy Inference Systems" Apr. 2001, pp. 253-268.
Guérin, Roch, *IEEE Journal on Selected Areas in Communications*, vol. 9, No. 7, "Equivalent Capacity and Its Application to Bandwidth Allocation in High-Speed Networks," Sep. 1991, pp. 968-981.
Kong, Seong-Gon, and Bart Kosko, *IEEE Transactions on Neural Networks*, vol. 3, No. 2, "Adaptive Fuzzy Systems for Backing up a Truck-and-Trailer." Mar. 1992, pp. 211-223.
Dimitriou, Nikos, and Rahim Tafazolli, *IEEE Communications Magazine*, "Quality of Service for Multimedia CDMA," Jul. 2000, pp. 88-94.

(Continued)

*Primary Examiner*—Steven Nguyen
(74) *Attorney, Agent, or Firm*—Sughrue Mion, PLLC

(57) ABSTRACT

Techniques for determining the eagerness of a call processing unit within a multiple processor call processing system to accept a new call or call upgrade, as well as call admission control and other call event processing, as well as system-wide load balancing through query of such eagerness are disclosed. Fuzzy logic and associated analysis is used to determine this eagerness. Eagerness for a particular call processing unit is determined in part with reference to the actual load of a call as well as an estimated load approximated using a probabilistic distribution function, such as a Gaussian distribution.

2 Claims, 25 Drawing Sheets

OTHER PUBLICATIONS

Willebeek-LeMair, Marc H., *IEEE Transactions on Parallel and Distributed Systems*, vol. 4, No. 9, "Strategies for Dynamic Load Balancing on Highly Parallel Computers," Sep. 1993, pp. 979-993.

Widrow, Bernard, and Michael A. Lehr, *Proceedings of the IEEE*, vol. 78, No. 9, "30 Years of Adaptive Neural Networks: Perceptron, Madaline, and Backpropagation," Sep. 1990, pp. 1415-1442.

Jang, Yeong Min, *Electronicsc Letters*, vol. 36, No. 3, "Central limit approximation approach for connection admission control in broadband satellite systems," Feb. 3, 2000, pp. 255-256.

Shaout, A. and P. McAuliffe, *Electronics Letters*, vol. 34, No. 20, "Job scheduling using fuzzy load balancing in distributed system," Oct. 1, 1998, pp. 1983-1985.

Rahin, et al.: "Call Admission Control Algorithms in ATM Networks: A Performance Comparison and Research Directions", Interim Research Report Draft 0.8. Sep. 29, 1998, XP002261448.

Hon-Wai Chu, et al.: "Call Admission Control of Teleconference VBR Video Traffic in ATM Networks", Communications—Gateway to Globalization. Proceedings of the Conference on Communications, Seattle, Jun. 18-22, 1995, Proceedings on the Conference on Communications (ICC), New York, IEEE, US, vol. 2, Jun. 18, 1995, pp. 847-851, XP000533122.

Qiang, Ren: "A Real-Time Dynamic Connection Admission Controller Based on Traffic Modeling, Measurement, and Fuzzy Logic Control", IEEE Journal on Selected Areas in Communications, Feb. 2000, vol. 18, No. 2, XP002261449.

Hellendoorn, et al.: "Fuzzy Traffic Management for Modern Telecommunications", Int. J. Uncertain, Fuzziness Knowl.-Based Syst., vol. 6, No. 2, Apr. 1998, pp. 189-199, XP009021248.

R.G. Cheng, et al, "Neural-Network Connection-Admission Control for ATM Networks," IEE Proc.-Communications, vol. 144, No. 2, Apr. 1997, pp. 93-98.

Chung-Ju Chang, et al, "Traffic Control In An ATM Network Using Fuzzy Set Theory," Department of Communication Engineering and Center for Telecommunications Research, National Chiao Tung University, 1994 IEEE, pp. 1200-1207.

* cited by examiner

| $f_1/f_2$ | vl | lo | me | hi | vh |
|---|---|---|---|---|---|
| vl | 1.0 | 0.9 | 0.8 | 0.5 | 0.2 |
| lo | 0.95 | 0.8 | 0.7 | 0.4 | 0.2 |
| me | 0.9 | 0.7 | 0.5 | 0.3 | 0.15 |
| hi | 0.6 | 0.5 | 0.3 | 0.2 | 0.1 |
| vh | 0.20 | 0.20 | 0.15 | 0.1 | 0.0 |

METHOD AND APPARATUS FOR CALL EVENT PROCESSING IN A MULTIPLE PROCESSOR CALL PROCESSING SYSTEM

RELATED APPLICATION

This application is related to co-pending patent application Ser. No. 10/187,089, filed on even date herewith, and entitled "METHOD AND APPARATUS FOR LOAD ESTIMATION IN A CALL PROCESSING ENVIRONMENT," which is incorporated herein fully by reference.

TECHNICAL FIELD

This invention generally relates to communications infrastructure and techniques, and particularly concerned with load estimation, load balancing and call admission control in call processing systems including plural call processing units.

BACKGROUND

In light of recent tightening of the credit markets and general drop-off in demand, telecommunications carriers are increasingly pressured to maximize return on their existing infrastructure and/or make wise choices when purchasing and deploying new telecommunications gear. Due in part to their cost and potential performance bottlenecks, especially when stretched beyond nominal loads, call processing systems within the carrier's network have drawn heightened scrutiny.

Traditional time-domain switched, voice-oriented communications typically included a single call processing unit tightly coupled to and servicing a given switch fabric or a dedicated portion thereof. Smaller, enterprise class telecom solutions such as a digital key system or private branch exchange included one call processing unit, whereas carrier grade central office solutions involved a dedicated call processing unit servicing a dedicated portion of the central office switching fabric. TDM switching techniques assured an actual or virtual connection be established and maintained for the duration of a call, at the expense of resource efficiency and dynamism.

With the advent of packet voice and softswitch solutions, the call processing system has been decoupled from the actual or virtual switching fabric, and a number of multi call processor designs have been developed, since each call processing unit is now capable of handling almost any call originating from or terminating to the larger system.

A representative multiple processor call processing system 2500 is shown in FIG. 25. In this system, plural individual call processing units or PMCis, including PMC1 2515 and PMC2 2520 and PMCK 2525; collectively handle a number of call processing activities and call events. The managing call processing unit, or PMC-M 2510, performs other call processing activities and events. Typically, in known multiple call processing system architectures, the PMCis 2515, 2520 and 2525 handle the bulk of the "individual call" oriented activities and tasks based on the subset of system calls they are assigned to handle, whereas the PMC-M 2510 is primarily responsible for coordinating operation of the PMCis as needed for e.g. system-wide call admission control and load balancing. As such, communication of coordination information (not shown) such as control, status, query and reporting messages occurs between these PCMis 2515,2520, 2525 and the PMC-M 2510 on a periodic and/or event-driven basis.

A well-known goal that multiple processor call processing systems (such as the system 2500 shown in FIG. 25) attempt to achieve with respect to call admission control (CAC) and load balancing is to maintain the QoS commitment for the existing calls (failing to introduce delays or packet loss in packet voice environments) while maximizing call capacity, and ultimately maximize efficient use of the call processing system. In particular, the goal is to provide an optimally efficient call handling situation in which all individual call processing units in a multiple processor call processing system are evenly and homogeneously (with respect to call type) loaded. Thus, ideally, call admission control and new call blocking will thus only occur where all these call processing units are already fully or nominally loaded.

To illustrate, refer to a simplified capacity diagram of a 6 PMCi call processing system 105 shown in FIGS. 1A-1C, generally consistent with the system 2500 shown in FIG. 25. As shown in each of FIGS. 1A-1C, each box within each PMC1 . . . PMC6 represents a call, with a shaded box 110 representing a voice call, a diagonally hatched box 112 representing a streaming call, and a transparent double-sized box 114 representing an interactive call. Each container 107 represents the capacity of a given PMCi. In FIG. 1A, the PMC1 . . . PMC6 of the multiple processor call processing system 105 are evenly and homogeneously loaded; in FIG. 1B, the load is even but not homogeneous; and in FIG. 1C the load is neither homogeneous nor even.

The risk presented in FIG. 1B is that if there is congestion in a given PMCi, most calls within such PMCi might be of the same nature thus making any call processing remedy more difficult. The risk posed in FIG. 1C is that while there is unused capacity on some PMCis (e.g. PMC2, PMC4, PMC6), other PMCis (e.g. PMC1, PMC3, PMC5) are very close to their nominal load and may not be able to provide sufficient service level guarantees or quality of service to the calls they are handling. As a result, the goal should be to maintain even and homogenous loads, as in FIG. 1A. It should also be noted that even this situation, the call processing system 105 may reach a loading condition where all the PMC1 . . . PMC6 are nominally loaded, and that the system cannot admit further new calls, but this situation happens less often, if the load is even.

In order to load balance a multiple processor call processing system, it is important to be able to estimate the resource utilization (in terms of e.g. bandwidth or processor loading) on each call processing unit at any given time. Once the per PMCi estimated loading is determined, one can prospectively load balance by admitting new calls based on which PMCi has free resources to handle the call. A simple brute force approach is to assume that each call is taking up its peak resource requirement, and that the estimated load is based on this peak resource requirement multiplied by the number of calls being handled. This obviously results in inefficient resource under-utilization, and cuts against some of the perceived variable bandwidth advantages afforded by packet voice transmission.

Another known technique for estimating resource utilization is based on a relationship between peak and average resource requirements for a given call type, e.g.:

$$\frac{\text{estimated resource utilization}}{\text{for a given call type}} = \frac{2 * peak * average}{peak + average} \quad (1)$$

Once the estimated resource utilitization for the different call types being or expected to be handled within the call processing system is known, each PMCi's loading can be estimated by determining how many of each type of calls are being serviced and multiplying each by this estimated resource utilization. Resources can be reserved within each of the PMCi consistent with the estimated resource utilization and additional capacity can be determined based on remaining unreserved resources.

FIG. 2 illustrates a plot of the estimated resource utilization curve 202 corresponding to the above equation (1) versus the average resource utilization. It is obvious that in this method, when the average is significantly smaller than the peak resource requirement, the estimated resource utilization approaches twice the average resource requirement (e.g. approaches line 204 having a slope of 2 in FIG. 2). Otherwise, the estimated resource utilization is always a 1 to 2 multiple of the average (e.g. always greater than, but approaching line 206 having a slope of 1). Ergo:

$$\text{average} << \text{peak} \Rightarrow \text{estimate} = 2 \times \text{average} \quad (2)$$

$$\text{average} \approx \text{peak} \Rightarrow \text{estimate} = \text{average} = \text{peak} \quad (3)$$

Thus, using this estimated resource utilization technique results in a overly-conservative loading estimation for the PMCis (i.e. more resources are estimated being used than is actually the case) and can potentially result in a false determination that a given PMCi is at nominal loading or overloaded when it still in fact has capacity. The call processing system can refuse to provide additional calls to the so-overloaded PMCi which still in fact has capacity, and worse, may prematurely refuse to admit further calls to the system (assuming the remaining PMCis are estimated at nominal or greater loading). On the other hand, it is unlikely that any one PMCi will be overbooked or oversubscribed, thus this technique is perceived at least being QoS friendly.

Further, this estimated resource utilization technique does not take into account the number of calls of a given call type being handled by a given call processing unit. It is well-known that the greater the number of calls of a given type are being serviced by a given PMCi, the less is the chance that these behave all the same way or utilize the same amount of resources. For example, it is highly improbable that, in the case of packet voice with silence suppression, that all handled calls will be in the more resource demanding active, vs. silent state. To account for this, it is generally known that a provisionable reservation coefficient may be used to augment the above to permit the PMCis and the call processing system generally to accept more calls than the above-described conservative estimation technique calls for, and in the typical and aggressive cases, more than the PMCis and the call processing system as a whole can actually handle. This overbooking is justified, especially as the number of calls increases and the probabilistic nature of the calls with respect to actual resource utilization (the probabilistic nature of calls, as used herein, means that the resource utilization for each call varies by time and may have any of a finite or infinite number of values within known limits). However, in known systems, the reservation coefficient, although provisionable, is constant within different hours of a day or days of a week, unless a system operator manually alters or updates it.

Therefore, it would be advantageous in a multiple processor call processing system if critical resource utilization could be better predicted, and consequently more accurate call admission and load balancing decisions could be made without detracting from overall system performance.

SUMMARY OF THE INVENTION

The present invention is directed in part to techniques for determining the eagerness of a call processing unit within a multiple processor call processing system to accept a new call or call upgrade. The invention is also directed to call admission control and load balancing through query of such eagerness. In particular, fuzzy logic is used to determine the eagerness.

Accordingly, consistent with one embodiment of the invention, in a call processing unit capable of supporting a plurality of call classes, method and apparatus are provided which includes attainment of first and second load parameters for the call processing unit, fuzzification of the first and second load parameters according to respective first and second fuzzification functions, comparison of the fuzzified first and second load parameters against a defined set of eagerness rules, defuzzification the result of the comparing, and generation of an eagerness to admit a call based on this defuzzification result. The first and second load parameters may include actual and estimated load parameters for the call processing unit. The estimated load may be approximated using a probabilistic distribution function. Homogeneous may also be consulted in determining this eagerness.

Consistent with another embodiment of the invention, in system comprising plural call processing units, a call admission apparatus and method are provided which includes monitoring a call admission eagerness for each of the call processing units, perception of a call admission request, selection of a target call processing unit having a relative maximum call admission eagerness, confirmation of the call admission eagerness by this target call processing unit with respect to the call admission request, and admission of the call if the target call processing unit eagerness is confirmed. Predetermined or call class malleable thresholding may be utilized to help determine if a target call processing unit is available. Also, another target may be selected if the eagerness cannot be confirmed by the initial target, and may be recursively performed until either no target call processing units are available, the admission request is withdrawn, or the call is successfully admitted.

Additional aspects and advantages of this invention will be apparent from the following detailed description of embodiments thereof, which proceeds with reference to the accompanying drawings.

BRIEF DESCRIPTION OF THE DRAWINGS

FIG. 24 illustrates a two variable fuzzy logic rules base according to an embodiment of the invention.

DETAILED DESCRIPTION OF THE EMBODIMENTS

Unless otherwise noted, the listed terms below, including abbreviations and symbols, will have the following meaning ascribed to them:

| term | meaning |
| --- | --- |
| Kbps | kilo bits per second |
| MIPS | Mega Instructions Per Second |
| msec | milliseconds |
| pdf | Probability Distribution Function |
| pmf | Probability Mass Function |
| PMCi | individual call processing unit |
| PMC-M | master or managing call processing unit |
| CoS | Class of Service or allocation-retention priority UMTS |
| QoS | Quality of Service |
| UMTS | Universal Mobile Telecommunications System |
| K | number of PMCis |
| L | number of inputs to a fuzzy logic |
| N | number of call classes |
| R | number of rules in a fuzzy logic |
| $f_i$ | i-th fuzzified value |
| $m_i$ | load in state i |
| $p_i$ | probability of state i |
| $\beta$ | CoS coefficient |
| $\epsilon$ | CAC threshold |
| $\gamma$ | activation of a rule |
| $\theta$ | class type |
| $\mu$ | mean |
| $\sigma$ | standard deviation |
| $\sigma^2$ | variance |
| $\Theta$ | nominal load |
| $\zeta$ | probability of exceeding the nominal load 0 |
| $\phi$ | eagerness |
| $\Phi$ | eagerness vector |
| $\omega$ | balance target |
| $\Omega$ | balance target vector |

Figure 25:
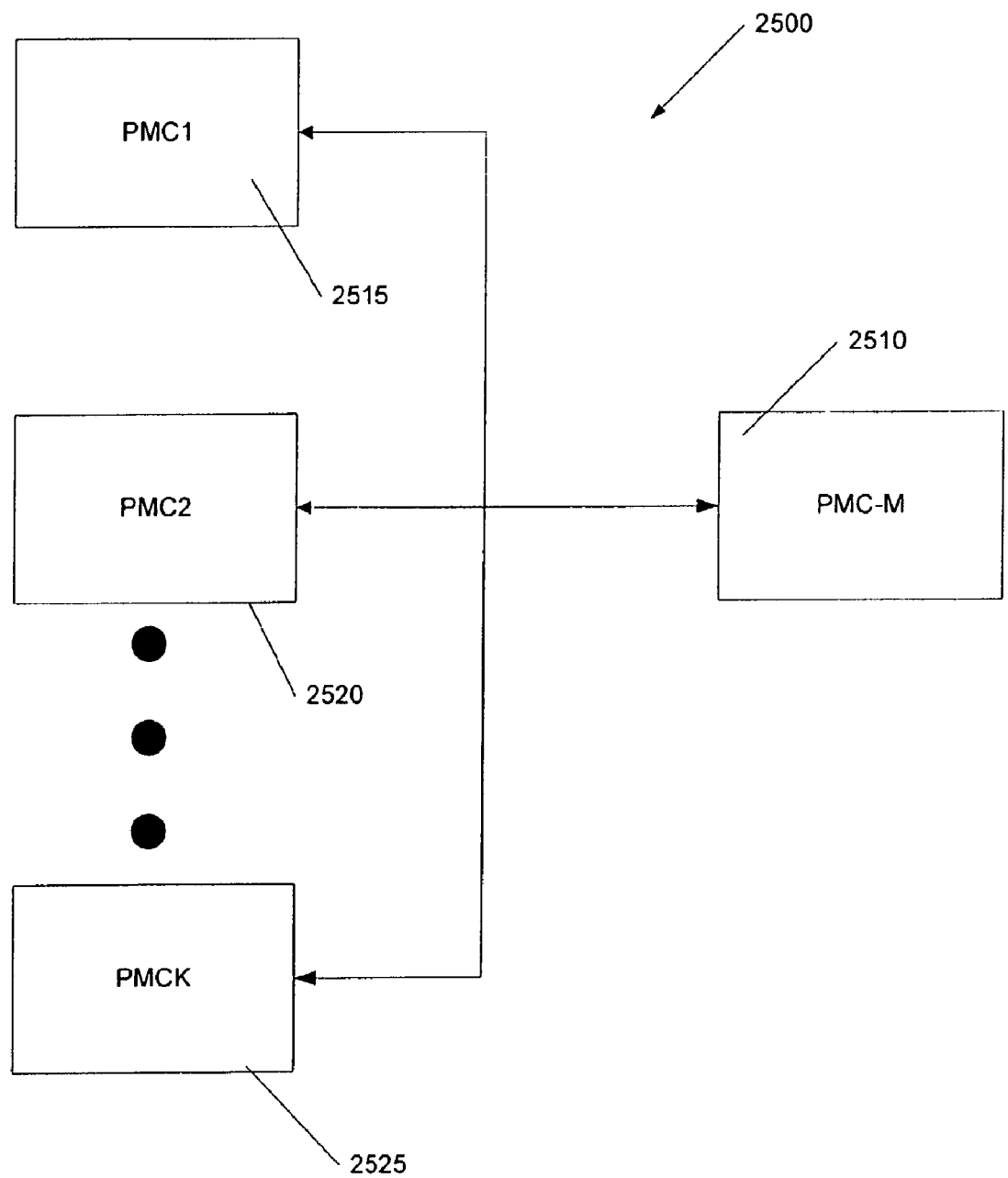
FIG. 25 is a simplified block diagram of a call processing system including plural individual call processing units coordinated by a single managing call processing unit.

For simplification purposes only, and not meant to limit the teachings of the present invention in any fashion, the disclosed embodiments presumes a single master call processing unit (PMC-M) coordinating several individual call processing units or PMCis (e.g. on the order of 50-60). See, e.g. FIG. 25. Further, each call is presumed follows a probabilistic behavior in accordance with a finite number of predefined states and that that resource utilization associated with such states can be determined.

In determining whether to admit a new call, one should see if the necessary resource such as processing load or bandwidth for the new call is available. If the resources are available, the new call can be admitted. An important action in packet switching systems with QoS requirement is resource reservation. It means that by admitting each new call, the call processing system or constituent call processing unit should restrain its eagerness to accept more new calls.

Load Estimation Theory

As previously discussed, if the reservation is made based on the maximum possible resource utilization or a relationship that disregards or oversimplifies the number of actual calls and their probabilistic nature, the efficiency of the call processing system will be less than optimal. Hence, consistent with one aspect of the present invention, the disclosed embodiments of the present invention utilize a probabilistic estimation of the load, based on the mean and variance of the resource utilization for a given call type and experienced call distribution.

In particular, the call processing system according to a specific embodiment generates a probability distribution function (pdf) of the total resource usage. Then based on this pdf, this call processing system calculates the probability of exceeding a nominal load value on a per call processing unit basis. This probability should be kept lower than a given threshold, by rejecting some calls if they are coming at the time of heavy load. So, in CAC and load balancing consistent with the present invention, this probability gives this call processing system a measure to accept or reject the new call or, if sufficient capacity exists at the system level, to determine which PMCi should handle the call.

To ease understanding, one or more of the disclosed embodiments selectively perform "static" load balancing of the call processing system based at least in part on the aforementioned estimated load results. Such load balancing seeks to make load balancing decisions (which call processing unit, if any?) with respect to a call only during admission of the call. However, the teachings of the present invention are not intended to be so limiting, and, as will be appreciated by those ordinarily skilled in the art, can be easily applied to dynamic load balancing of calls where, in addition to balancing at admission, calls can be transferred from one call processing unit to another on fly. See, e.g. Willebeek-LeMair et al., "*Strategies for Dynamic Load Balancing on Highly Parallel Computers*", IEEE Transactions on Parallel and Distributed Systems, Vol. 4, No. 9, Sep. 1993 incorporated herein fully by reference.

In the disclosed embodiments, assume that an individual call processing unit or PMCi can handle a limited number of call types or classes of service: $\theta_1 \ldots \theta_N$. Each class has a different set of QoS requirements.

For each call type or class, there is basically a different probabilistic pattern. The probabilistic pattern identifies the probability (or percentage) of being in a set of discrete states or modes (active/non active or silence/speech, for example). Assuming there is usually 1 to 3 discrete states and that the resource usage in each state individually is known through empirical data, predictive analysis, or otherwise. For example, in packet voice conversation, there are two basic states: silence and speech. The probabilities of being in each one of these two states is $p_1$ and $p_2$, where $p_1+p_2=1$. The resource utilization for each state is $m_1$ and $m_2$, respectively. The goal is to estimate the load (resource utilization) based on the a priori knowledge about these classes and the number of existing calls in each type or class. The probabilistic behavior of the calls is usually reflected in the active/silence mode of voice or the burstiness (of data).

For discussion purposes only, assume the call types or classes to be conversation (mainly voice), streaming, interactive (web data), and background (email), as listed below. In other embodiments, other call types such as fax, telecommands, etc may be considered as will be appreciated by those ordinarily skilled in the art.

| call type | $p_1$ | $m_1$ | $p_2$ | $m_2$ |
|---|---|---|---|---|
| conversation | 60% | 12.2 Kbps | 40% | 1.95 kbps |
| streaming | 100% | 128 Kbps | 0 | 0 |
| interactive | 10% | 128 Kbps | 90% | 0 |
| background | 100% | 128 Kbps | 0 | 0 |

For illustration purposes, bandwidth is presented in the above chart as the required resource. However, as will be discussed in more detail below, the processing load or CPU consumption of a PMCi will be also be used, as it can be the more the scarce type of call processing resource, especially in larger call processing environments.

Figure 1A:
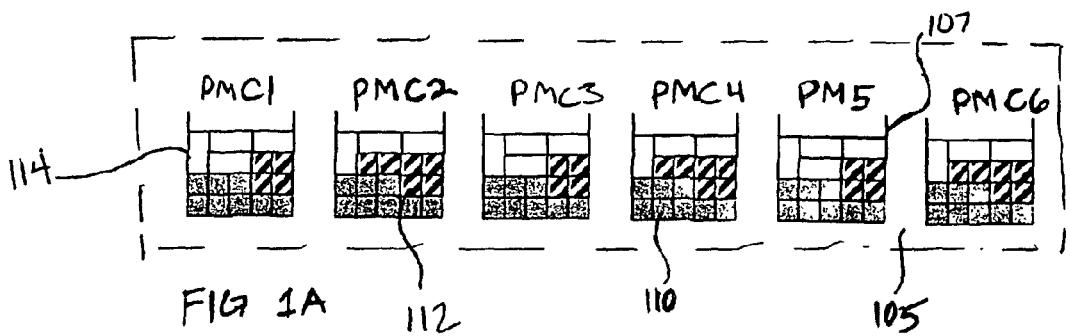
FIGS. 1A-1C illustrate the concepts of load balancing and homogeneousness consistent with the present invention.
Figure 1B:
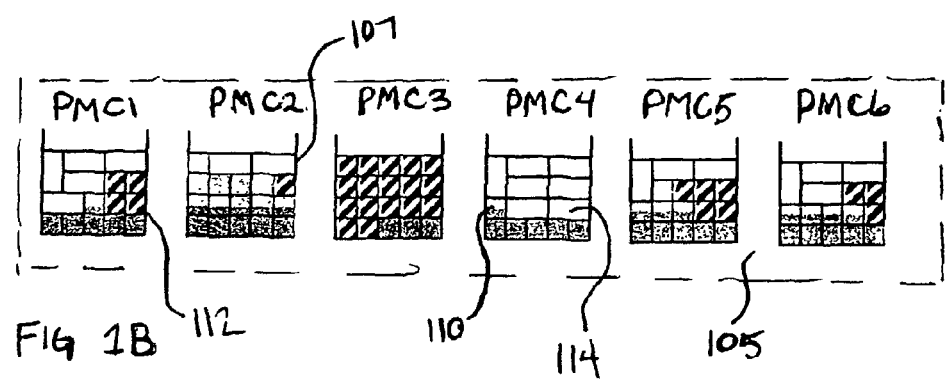
Figure 1C:
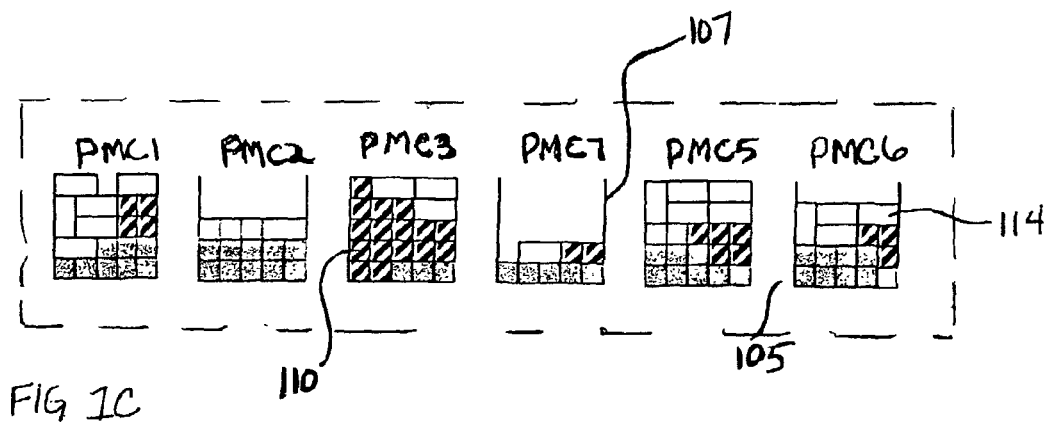
Figure 2:
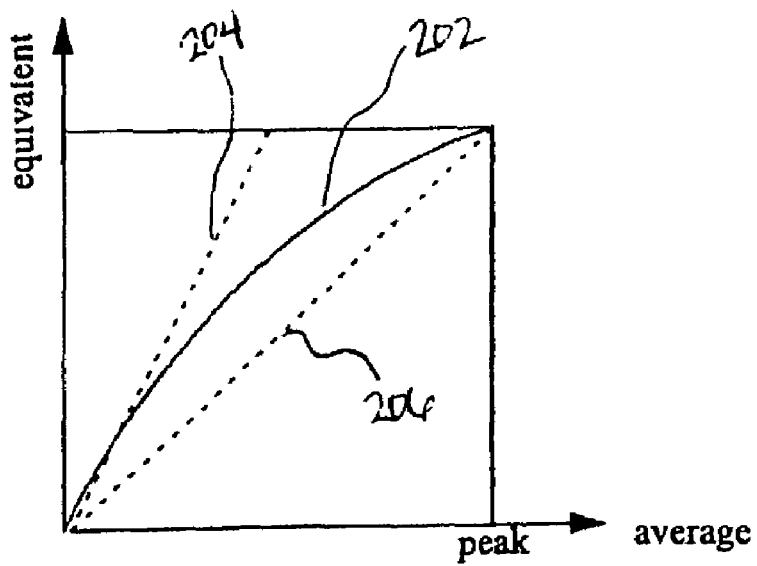
FIG. 2 illustrates conventional load estimation.
Figure 3:
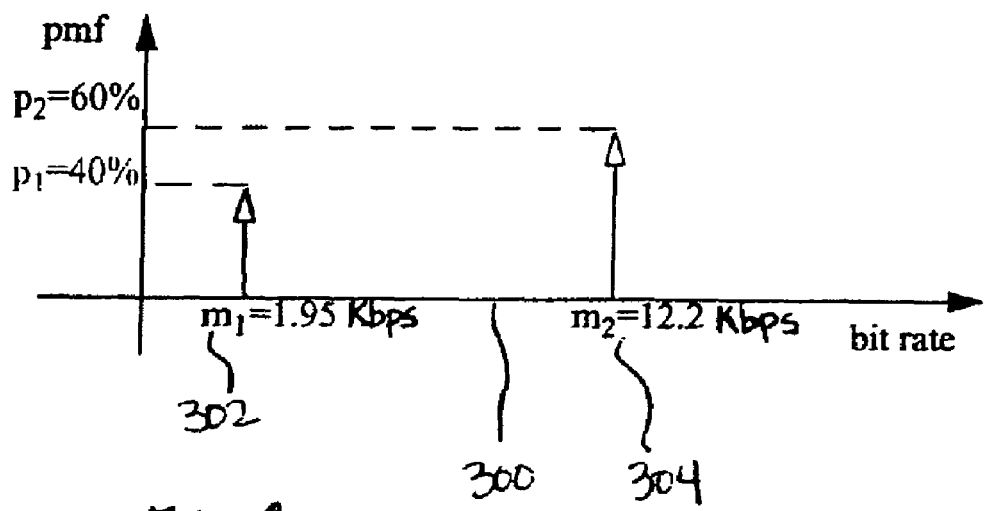
FIG. 3 illustrates resource utilization modes and probabilities.

As an example, FIG. 3 depicts a discrete probability mass function (pmf) of one call within a type/class (say, the voice class, here). The horizontal axis represents the resource requirement, here bandwidth expressed as a bit rate. As shown in the FIG., the probability that the resource requirement 300 will be in discreet state 1 (i.e. silence) is 40%, with a characteristically low resource requirement 302 ($m_1$) of 1.95 Kbps. Likewise, the probability that the resource requirement 300 will be in discrete state 2 (active conversation) is 60%, with a characteristically higher 12.2 Kbps bandwidth requirement 304 ($m_2$). Likewise, the probability.

In the following subsections, we first show how to obtain the pdf of a number of calls in each class and then we obtain the pdf of the total load within a PMC. The mean and variance are calculated as follows:

$$\mu = p_1 \cdot m_1 + p_2 \cdot m_2 = 8.1 \text{ kbps.} \quad (4)$$

And the variance is:

$$\sigma^2 = p_1 \cdot (m_1 - \mu)^2 + p_2 \cdot (m_2 - \mu)^2 = 25.21. \quad (5)$$

Which yields a standard deviation of $\sigma = 5.02$.

The well-known central limit Theorem states that "by summing up a sufficient number of independent stochastic variables, we get a new variable, which has a Gaussian distribution". This approach has been already used for connection admission for satellites as described in Yeong Min Jang's "*Central limit approximation approach for connection admission control in broadband satellite systems*", IEE Electronics Letters Vol. 36, No. 3, 3$^{rd}$ Feb. 2000 incorporated herein fully by reference. The mean and variance of this Gaussian distribution are easily calculated as follows:

$$\sigma^2 = \sum_{i=1}^{N} \sigma_i^2 \quad (6)$$

$$\mu = \sum_{i=1}^{N} \mu_i \quad (7)$$

Where $\mu_i$ and $\sigma_i^2$ are respectively the mean and variance of one call. As a result, if we keep the example of the previous subsection, by adding N calls, the mean and variance will be: $\mu = 8.1 * N$ Kbps and $\sigma^2 = 25.21 * N$. For instance, $N=100$ gives $\mu = 8100$ Kbps and $\sigma^2 = 2521$ Kbps.

Figure 4A:
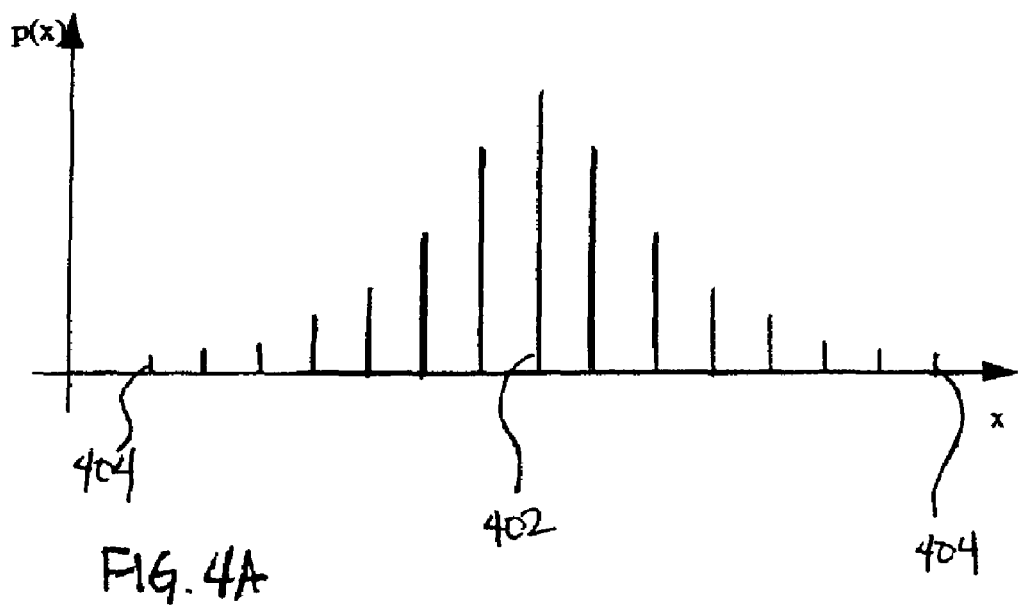
FIGS. 4A-4C illustrate Gaussian characteristics of load estimation consistent with the present invention.
Figure 4B:
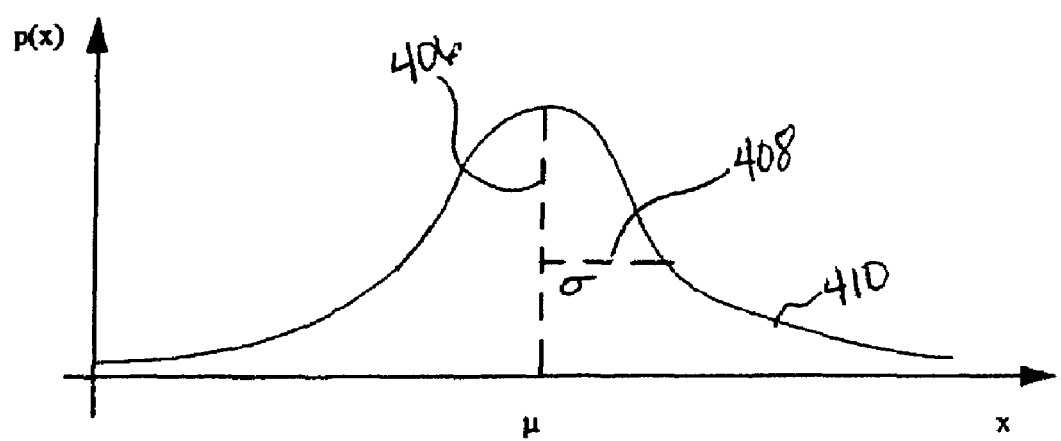

The mean value calculated here for the total distribution is simply the sum of all the average values. The variance is also the sum of the variances attributed to all of the calls. When, for example, 100 calls of one type together, the mean value gets 100 times bigger; so does the variance; however, the standard deviation, σ, gets only 10 times bigger. This means that the more calls are added up in a PMCi, the bigger is the mean and the standard deviation, but the smaller would be their ratio $\mu/\sigma^2$. A generalized plot of the probability distribution function in accordance with this algorithm is shown in FIG. 4B, with the μ 406 and the σ 408 denoted.

It should be noted that this algorithm is an approximation that becomes more accurate for larger values of N. However, this approximation is believed good enough in providing an estimated load commensurate with the goals of the invention. In fact, a well known method to construct a random variable with Gaussian distribution is to add N (usually 12) random variables with uniform distribution (such as using rand( ) in the "C" programming language).

Alternatively, the exact form of the distribution can be obtained by applying N times convolution of the original pdf with itself. The more accurate calculation is that for this case, the distribution of the sum is a series of impulses at $i*m_2 + (N-i)m_1$, where $0 \leq i \leq N$. The probability at each point is $C_N^i \cdot p_2^i \cdot p_1^{N-i}$, as shown in FIG. 4A. The absolute maximum 402 and minimum 404 possible values for x are respectively $N*m_1$, $N*m_2$ or 1220 Kbps to 195 Kbps in the example where $N=100$ as described above.

Though not implemented in the embodiments disclosed below, there is another point here which applies to the classification of the calls in different classes. Some calls, for some reasons may have different resource usage than others, although they may be in the same class. For instance, a voice call may have "A" times processing power requirement than others, because of the special conditioning or additional processing to be applied to the call, such as silence suppression or ciphering. Therefore, provision may be made to count such a call A times more than "an ordinary call".

The next step is to add the variables obtained in each class, to obtain the pdf of the whole resource usage in all of the classes for a given PMCi. Again, the central limit Theorem implies that "the sum of any number of variables with Gaussian distribution, is a new variable with a Gaussian distribution." The mean and variance of the new variable can be simply obtained by summing up the mean and variances of the elements.

Figure 4C:
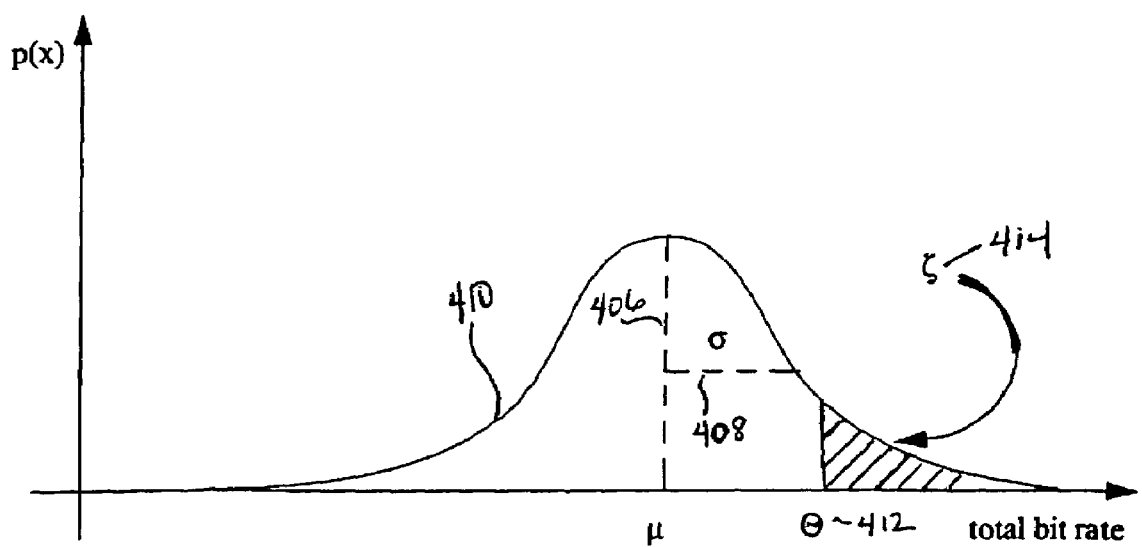

As discussed above, the total pdf has a mean and a variance that can be obtained from simple arithmetic. The pair of values (mean, standard deviation) are the only parameters we need when using the Gaussian distribution's error function. In FIG. 4C, which again shows a Gaussian approximation of the probability distribution function, Θ 412 (maximum allowable resource utilization or nominal load) and ζ 414 (probability of exceeding the nominal load—the hatched area 412 under the curve 410) defined such that: $p(x > \Theta) = \zeta$.

For each PMCi, based on the current number of the admitted calls in each class, we can calculate the probability of having the total resource usage exceeding the maximum allowable value set for the resource (say for example, 2 Gbps for bit rate or 99% of CPU usage). In other words, we can determine the probability of having the total resource utilization for a PMCi exceeding the nominal load specified for that PMCi.

Alternatively, having a provisioned tolerable probability for exceeding the nominal value, we can determine for each PMCi, whether the value corresponding to this probability is smaller or greater than the maximum allowable resource utilization.

A load estimation algorithm according to an embodiment of the invention, based on the statistical analysis and Gaussian distribution discussed above will now be disclosed. Unlike the above, however, the scarce resource is now processing load (in the unit of instruction cycles/sec or any other measure of processor utilization within a call processing unit)

In each one of the N classes (here N=4 for voice conversation, streaming, web data interactive and streaming), assume that there are two modes: active and non-active. The probability of being in each state is also considered to be known ($p_1$, $p_2$, respectively). The ratio $p_1/p_2$ is a main characteristic of each class. It should be understood that this is a simplifying assumption to have only two modes (active and non-active) and that in reality, more than two modes might be possible. However, this does not affect the disclosed algorithm as long as one can translate these numbers to form a Gaussian distribution with a known $\mu, \sigma^2$.

The first action is to measure the number of instruction cycles/sec (processing resource utilization) corresponding to each of the two modes: active and non-active for given call class or type. These two parameters are known as $m_1$ and $m_2$. Note here that there are however a number of other parameters that affect the number of instruction cycles being used to support the call mode. These parameters may include some or all of the following parameters in an e.g. UMTS call processing environment, including:

| | | |
|---|---|---|
| enum | TTI | (10, 20, 40, 80 msec.) |
| boolean | CRC | |
| boolean | Ciphering | (on or off) |
| enum | RLC_mode | (TM, AM, UM) |
| boolean | PS/CS | |
| int | No_of_RL | (1 <= No_of_RL <= 6 but usually 1, 2, or 3) |
| int | No_of_TB | |
| int | Rate | (up to 2 Mbps) |

The term PS here refers to Packet Switching and CS refers to Circuit Switching. The Boolean PS/CS indicates whether a UMTS call is either packet or circuit standard respectively. The CRC Boolean indicates whether Cyclic Redundancy Coding is used with a given UMTS Call. RLC_mode refers to the UMTS radio link mode associated with a call (TM: transparent mode; AM: acknowledged mode; and UM: unacknowledged mode). TTI refers to the Transmission Time Interval. The No_of_TB refers to the number of traffic bearers. Finally No_of_RL refers to the number of UMTS radio links available for the UMTS call.

A fast look at these parameters may suggest that the actual number of classes is more than what was assumed above (here N=4). However, despite the fact that based on the actual values of these parameters some of the statistical characteristics of the call varies, some others remain intact. The ratio $p_1/p_2$, for instance does not change and, that in most cases, both $m_1$, $m_2$ are assumed to change proportionally. Once more, as will be appreciated by those ordinarily skilled in the art, this is a simplifying hypothesis which may inject some inaccuracy in the modeled probability distribution function. However, as will be discussed below, fuzzy logic may be conveniently implemented to interpret this statistical model such that simplification inaccuracies will not deter from arriving as a correct result.

First, for each class of call (say voice conversation for example) consider a set of given call parameters such as:

| TTI | CRC | Ciphering | RLC_mode | PS/CS | No_of_RL | No_of_TB | Rate |
|---|---|---|---|---|---|---|---|
| 20 msec | 0 | 0 | TM | CS | 3 | 1 | 12.2 Kbps |

Then, based on these parameters, $m_1$ is obtained for the active mode and $m_2$ for the non-active mode. Next, a different set of parameters is assumed, which results in a new ($\overline{m}_1$, $\overline{m}_2$) pair. By making the assumption that $m_1/m_2$ is close enough to $\overline{m}_1/\overline{m}_2$ for load estimation purposes consistent with the present embodiment, classification is greatly simplified. The rationale behind this assumption is twofold: first, it appears that most of these parameters influence the complexity in the same way. And second, although some inexactitude may be encountered with this assumption, in average it will not be a big problem. Finally the resulted simplification is worth this small inexactitude.

As a result, in accordance with the present embodiment, one can characterize a class with 2 states or modes, each with associated probabilities ($p_1$, $p_2$) and corresponding resource requirements ($m_1$, $m_2$) which can be obtained directly through empirical measurements. Several combinations of the call parameters discussed above are considered and for each set the load is measured. Then an algorithm may be used to fit a function to those parameters. The derived mode probability and resource requirements in turn give the representative pair of $\mu$, $\sigma^2$ as described above.

Consider the following table showing a restrained number of the combinations of the call parameters (ciphering Y/N, CRC enabled Y/N) in an UMTS multiple processor call processing system:

| call type | ciphering | CRC | $\mu$ | $\sigma^2$ |
|---|---|---|---|---|
| conversation | y | — | 2.496 | 0.000864 |
| " | — | y | 2.066 | 0.000024 |
| " | — | — | 1.900 | 0.000000 |
| streaming | y | — | 4.110 | 0 |
| " | — | y | 3.250 | 0 |
| " | — | — | 3.120 | 0 |
| interactive | y | — | 1.374 | 0.831744 |
| " | — | y | 1.279 | 0.431649 |
| " | — | — | 1.257 | 0.385641 |
| background | y | — | 4.110 | 0 |
| " | — | y | 3.250 | 0 |
| " | — | — | 3.120 | 0 |

Although not presented herein, more columns in this table should be provided which represent other parameters having some influence on the values of $\mu$, $\sigma^2$, such as the bit rate, or the number of radio links in a wireless system (e.g. 1-6 links in a UMTS system). Additionally, other real world factors may be considered and the resource requirement algorithm made more complex to accommodate such factors. For example, in a wireless call processing system implementation, the number of radio links which has also a probabilistic character may be investigated. In such a case, the variances obtained will be substantially higher for conversation calls, and not necessarily zero for streaming calls.

When more extensive parameter combinations are considered, a neural network be may employed to make this function fitting, when more combinations are considered. See e.g. Bernard Widrow et al., "30 *Years of Adaptive Neural Networks: Perceptron, Madaline, and Backpropagation*", Proceedings of the IEEE Vol. 78, No. 9, September 1990 which is incorporated herein fully by reference. The well known error backpropagation algorithm can be used to train the neural network and the resulted neural network will be optimized to have the smallest error for the set of empirical measurements. The generalization characteristic of the neural network acts so that it will have good performance for the sets of parameters out of its training set, as well. In case that one uses a neural network with no hidden layer, this solution simplifies to a linear combination but by having at least one hidden layer and nonlinearity in it, very complex nonlinear functions can also be approximated. A table outlining load estimation based on capacity measurement & Gaussian distribution with ciphering:

| Call Type | $p_1$ | $m_1$ (MIPS) | $p_2$ | $m_2$ (MIPS) | Mean (MIPS) | standard dev (MIPS) |
|---|---|---|---|---|---|---|
| Conversional | 60% | 2.520 | 40% | 2.460 | 2.496 | 0.0294 |
| Streaming | 100% | 4.110 | 0% | 0 | 4.110 | 0 |
| Interactive | 10% | 4.110 | 90% | 1.070 | 1.374 | 0.912 |
| Background | 100% | 4.110 | 0% | 0 | 4.110 | 0 |

Though not considered above, it should be noted that a class of service ("CoS") dependent parameter $\beta$ can be multiplied to mean and variance for each call, which will reflect the importance of each class, or alternatively, call allocation or retention priority as contemplated within a UMTS communications system. For example, in "gold", "silver" and "bronze" classes of service, we can have $\beta=1.4$, 1.2, 1 respectively. This will mean that there will be higher estimated resource requirements and consequently more resource reservation performed for calls in higher classes compared to the calls in lower classes.

In this embodiment, it is envisioned that each PMCi manages a table of its admitted calls including call type or class, $\mu$, $\sigma^2$ either within the admitted call table or as part of a separate resource knowledge base. Consider the following admitted table with class mean and variance individually specified:

| call # | class | $\mu$ | $\sigma^2$ |
|---|---|---|---|
| 0 | voice | | |
| 1 | stream | | |
| 2 | data | | |
| 3 | voice | | |
| ... | ... | ... | ... |
| T | email | | |

The call type is simply the indicator of one of the N classes. For each class we make a summation over the $\mu$, $\sigma^2$ values, namely $\mu$(conversational), $\mu$(streaming), $\mu$(interactive), $\mu$(background). For instance, $\mu$(conversational)=sum of $\mu$'s for all conversational calls in this PMC. The variance $\sigma^2$ of each class is obtained in the same way. Finally, total $\mu_t$, $\sigma^2_t$ for the PMC are obtained by summing the $\mu$, $\sigma^2$ for all the classes. The values of $\mu_t$, $\sigma^2_t$ can be updated once a new call is admitted or an existing call is terminated (or modified) by simply adding or subtracting the corresponding $\mu_c$, $\sigma^2_c$.

When the call's parameters are changed, new mean and variance are calculated and put in the table but before that the old values are subtracted from the sums. There is no need to rebuild the $\mu_t$, $\sigma^2_t$ values from scratch each time, though such processing is contemplated below with reference to FIG. 7. Thus, the following rules may be established: 1) the initial values of $\mu$, $\sigma^2$ (for all classes) are zero. 2) Upon the admission of a new call, the values of $\mu$, $\sigma^2$ are increased. 3) Upon termination of each call, the values of $\mu$, $\sigma^2$ are decreased. And, 4) upon alteration of each call, the values of $\mu$, $\sigma^2$ are first decreased by the old value from the table and then increased by its new value.

In this stage, for each class, c, we have the corresponding $\mu(c)$, $\sigma^2(c)$. We add these values over all the classes to obtain one $\mu_t$, $\sigma^2_t$ pair representing the whole load on a PMC.

By calculating $\mu_t$, $\sigma^2_t$, we know all that we need to know about the distribution. Usually we want to calculate the probability, $\zeta$, of exceeding a nominal value of the resource usage, $\Theta$.

$$\zeta = \frac{1}{2} erfc\left(\frac{\Theta - \mu}{\sigma\sqrt{2}}\right) \quad (8)$$

where erfc(·) is the complementary error function of a normal distribution (a built-in function call in "C" and also implementable as a look-up table).

include "math·h"

double y=erfc((Theta−mean)/(sqrt(2)*stdev))/2;

Where Theta, mean, stdev respectively stand for $\Theta$, $\mu$, $\sigma$. This function can be kept in a table, for simplicity. The following table lists the value of error probabilities $\zeta$ for the various $(\Theta-\mu)/\sigma$. For example, we see that for having a $\zeta=1\%$, $\Theta$ should be equal to $\mu+2.33*\sigma$. At $\mu+5*\sigma$, $\zeta$ is practically zero.

| $\zeta$ | $(\Theta - \mu/\sigma)$ |
|---|---|
| 10% | 1.28 |
| 5% | 1.65 |
| 3% | 1.88 |
| 2% | 2.06 |
| 1% | 2.33 |
| 0.05% | 3.30 |
| 0.0000287% | 5.00 |

Either value can serve as a guideline to decide either to accept or to reject a new call. The use of this estimate, along with some other estimates is the subject of the next section where we explain a fuzzy logic controller for this effect and we show how to use this parameter along with a couple of other ones to determine the eagerness of each PMC to receive a new call. It is also noteworthy that since $\zeta$ is an input to a fuzzifier, we can simply directly feed $(\Theta-\mu)/\sigma$ to the fuzzifier.

What's our a priori estimation of the total $\sigma_t/\mu_t$? The intervening parameters are multiple: first the number of calls in each class and second the characteristic that we consider for each class. For instance the more calls of streaming type we have, the narrower is the Gaussian distribution. Below we examine a few examples.

In the following examples, we give some numerical values to the different classes of calls and at the end verify the aggregated traffic.

EXAMPLE 1

Conversation Class

Let's assume that we have only 150 voice calls.

$$\mu = p_1 \cdot m_1 + p_2 \cdot m_2 = 2.496 \text{MIPS} \quad (9)$$

$$\sigma^2 = p_1 \cdot (m_1 - \mu)^2 + p_2 (m_2 \mu)^2 = 864.36 \text{M, so } \sigma = 20.4 \text{KIPS} \quad (10)$$

Then $\mu_t = 374.4$ MIPS and $\sigma^2_t = 1.29654*10^{11}$ and $\sigma_t = 360$KIPS. In other terms, in this scenario, we have a narrow Gaussian distribution, in part because of the big number of voice calls that we consider.

EXAMPLE 2

Streaming Class

For streaming, the situation is simpler, because basically we have $p_1 = 1$ and $p_2 = 0$. So $\sigma^2 = 0$ and the problem is not probabilistic anymore. Considering 5 streaming calls with $m_1 = 4.11$ MIPS, we have $\mu_t = 20.55$ MIPS and $\sigma_t = 0$.

EXAMPLE 3

Interactive Class

Data, however, has usually a more probabilistic manner, as we may experience bigger $\sigma^2$ values for data. Here, we just create an example for data:

$$p_1 = 0.1, p_2 = 0.9 \quad (11)$$

$$m_1 = 4.11 \text{MIPS}, m_2 = 1.07 \text{MIPS} \quad (12)$$

$$\mu = p_1 \cdot m_1 + p_2 \cdot m_2 = 1.374 \text{MIPS} \quad (13)$$

$$\sigma^2 = p_1 \cdot (m_1 - \mu)^2 + p_2 \cdot (m_2 - \mu)^2 = 831744 \text{MIPS, so } \sigma = 0.912 \text{MIPS} \quad (14)$$

If we consider 20 data calls, it comes to $\mu_t = 27.48$ MIPS and $\sigma^2_t = 16.63^{12}$. and $\sigma_t = 4.078$ MIPS.

EXAMPLE 4

Aggregated Traffic on a PMCi

By adding all the voice, streaming and data calls in the three previous examples, we calculate $\mu_t$, $\sigma_t$ as in the following table. In the table, we give also the mean and standard deviation values for some other numbers of different types of calls.

| Convers. | streaming | interact. | backgr. | μ | σ | ζ |
|---|---|---|---|---|---|---|
| 150 | 5 | 20 | 0 | 422.43 MIPS | 4.093 MIPS | 0 |
| 20 | 5 | 150 | 0 | 275.49 MIPS | 11.170 MIPS | 0 |

Consider that the total permitted instruction cycles on the board is $\Theta = 450$ MIPS. This means that the probability of exceeding $\Theta$ from the above-mentioned formula is practically zero $\zeta = 0$. In fact, $\zeta$ can be reasonably assumed to be zero for $\mu_t = 5\sigma_t = 442.9$ MIPS.

Call Admission Control ("CAC") and Load Balancing

In this section, CAC decision and the load balancing according to several distinct embodiments are explained. The CAC decision is made in two steps: the initial step where the PMC-M makes a guess on the best PMCi able to handle the call based on reported eagerness. An early CAC algorithm can be included here for assisting the managing call protection unit to make the decision of either to accept or to reject a call, if none of the PMCis are eager enough to accept the new call. In the second step, the chosen PMCi itself reviews if it really is in the state of accepting the call or not. Consistent with these embodiments, fuzzy logic is used in parts of both processing to arrive at CAC and load balancing decisions.

The disclosed embodiments all try to even the load on the individual PMCis to reduce risk of overloading and underloading PMCi capacity, as well as enhance efficient use of scarce and expensive processing resources. In addition, several of the disclosed embodiments attempt to homogenize the load among the PMCis. Homogenizing herein means that the ratio between the effect of different types and service classes be approximately the same in all PMCis. In other words, if half of the total load (in all PMCis) in the call processing system is voice, the same ratio is maintained in all PMCis. By doing so one equalizes the chances of exceeding the nominal load in all PMCis.

The following arguments explain why a homogeneous load is advantageous: (1) various classes have different types of QoS requirement. For instance some are more sensitive to delay and some are more sensitive to discard. By having a homogeneous load, that is assurance that those natural differences can be handled by the PMCis. In contrast to this, if all delay sensitive calls are in one PMCi, and all non delay sensitive calls in another PMC, there will be little, if any, flexibility for any special case handling technique to operate successfully - for instance, the PMCi having all delay sensitive calls can not handle the situation by delaying some of the calls.

The disclosed models supporting these embodiments are based on a partial knowledge of the system; modeling for some classes is better than for others. By having a homogenous load, one avoids that most of the inexactitude because of the inaccurate modeling fails to gather in a single PMCi and increase estimate inaccuracies disproportionately.

Finally, as different classes of calls have different variances for their pdfs, if one forces an evenly distributed load but not necessarily load homogeneity, a call processing system may end up in a situation where for some of the PMCis, the probability of exceeding the nominal value is small but for some others, it is not. This would be the case, for instance when most voice calls go to one PMCi; most data to one and most streaming and background each to another PMCi. As streaming calls have insignificant variance, they show a very narrow pdf, while interactive calls show very large variances.

Though not disclosed as part of the specific embodiments, other criteria may be also important and should be considered as will become apparent to those ordinarily skilled in the art. For instance, consider the ability to maintain the QoS of existing calls (delay, BER, dropping). This means that there would be a feedback from the overload module to the CAC (and load balancing) functions. If a given PMCi experiences packet discard, or excessive delay (for delay sensitive calls), the PMCi should be marked as to be less eager to accept new calls. This concept introduces some kind of adaptability to the system.

Moreover, consider time of the day/week in which the call is or intended to take place. Also, the time span of a call: a voice call has an average duration of about 90 seconds while some interactive and streaming calls may have much longer durations. This fact may also be considered as an input to the CAC and load balancing decisions.

Consistent with one or more embodiments of the invention and based on the following parameters that are available about each PMCi, an initial guess on CAC and the optimum PMCi is selected based on: 1) the ensemble of calls which yield the pdf ($\mu_2$, $\sigma^2_t$) in each PMC; 2) the periodically updated measurement of the PMC loads; and 3) the QoS type and CoS (requirements of the new call).

In the disclosed embodiments, a resource knowledge base (e.g. knowledge base 1310 in PMCi 1300 shown in FIG. 13 or knowledge base 1310 in PMC-M 1800 shown in FIG. 18) is used to retain call class mean and variance information, either for a specific PMCi or the PMC-M. Resource knowledge base development according to an embodiment of the invention will now be detailed with reference to FIG. 5. Assembly of this knowledge base may be performed upon call processing unit installation, upgrade or other change, or on an as-needed basis when the types of supported call classes change.

Figure 5:
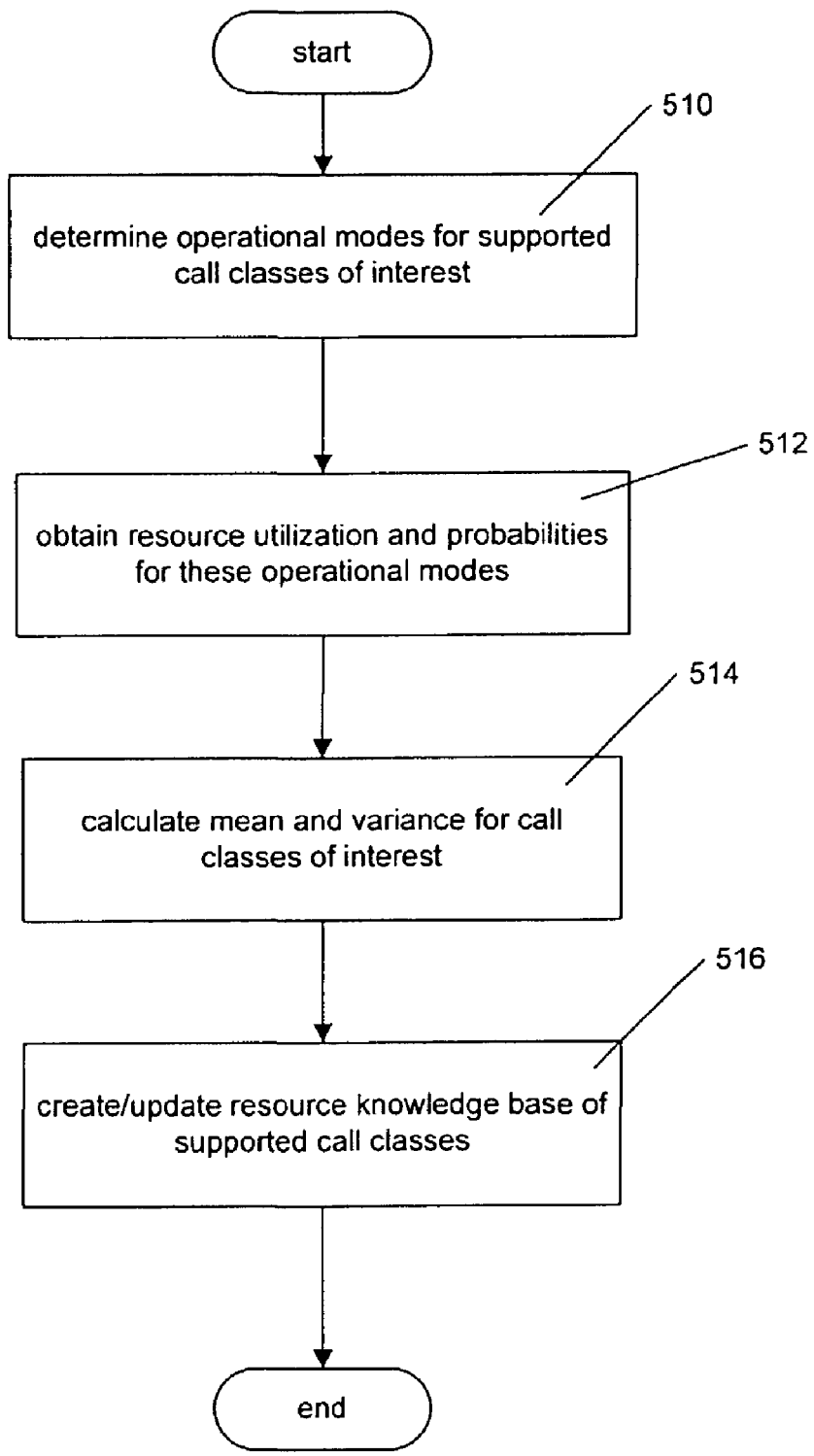
FIG. 5 is a flowchart illustrating resource knowledge base processing according to an embodiment of the invention.

Referring to FIG. 5, control first passes to step 510, in which the operational modes for the supported call classes of interest are determined. This may constitute all of the supported classes if the knowledge base is being assembled from scratch, or a subset thereof when only certain call class information needs to be corrected or updated. As mentioned above, each supported call class most likely have at least two discrete states of operation, as in the example of "active" and "silence" for the voice call class. Control thereafter passes to step 512, in which resource utilization or each of the operational modes as well as the probability of being in such operational mode is then obtained. Such resource utilization and probabilities information may be obtained through empirical measurement of actual call conditions or predicted using appropriate predictive techniques, as described herein or as is well known in the art. Thereafter, in step 514, the mean and variance for each of the call classes of interest will be calculated using the obtained resource utilization in operational mode probabilities obtained in step 512. Thereafter, in step 516, the knowledge base of supported call classes is updated with the new mean variance information. Knowledge base creation or update processing according to the present embodiment then terminates naturally.

Load estimation performed by either the interested individual PMCi call processing unit (see e.g. load estimator 1330 in PMCi 1300 of FIG. 13 or the load estimator 1430 in PMCi 1400 of FIG. 14) or the master PMC-M call processing unit (e.g. see the load estimator in the resource utilization unit 1850 in the PMC-M 1800 of FIG. 18) according to an embodiment of the invention will now be described with reference to FIG. 6. Here, the estimated load is recalculated every time a call event such as a new call admission, an admitted call termination or an admitted call classification modification event has occurred with respect to an individual call processing unit, whether or not responsive action is taken by that individual call processing unit or the master call processing unit. More particularly, the current collective mean ($\mu_t$) and variance ($\sigma^2_t$) values which are used to generate the estimated load measure for a particular PMCi (e.g. PMCp) are selectively updated upon detection of a call event involving such PMCp, by either the PMC-M or the PMCp as well as the particular type of call event.

Figure 6:
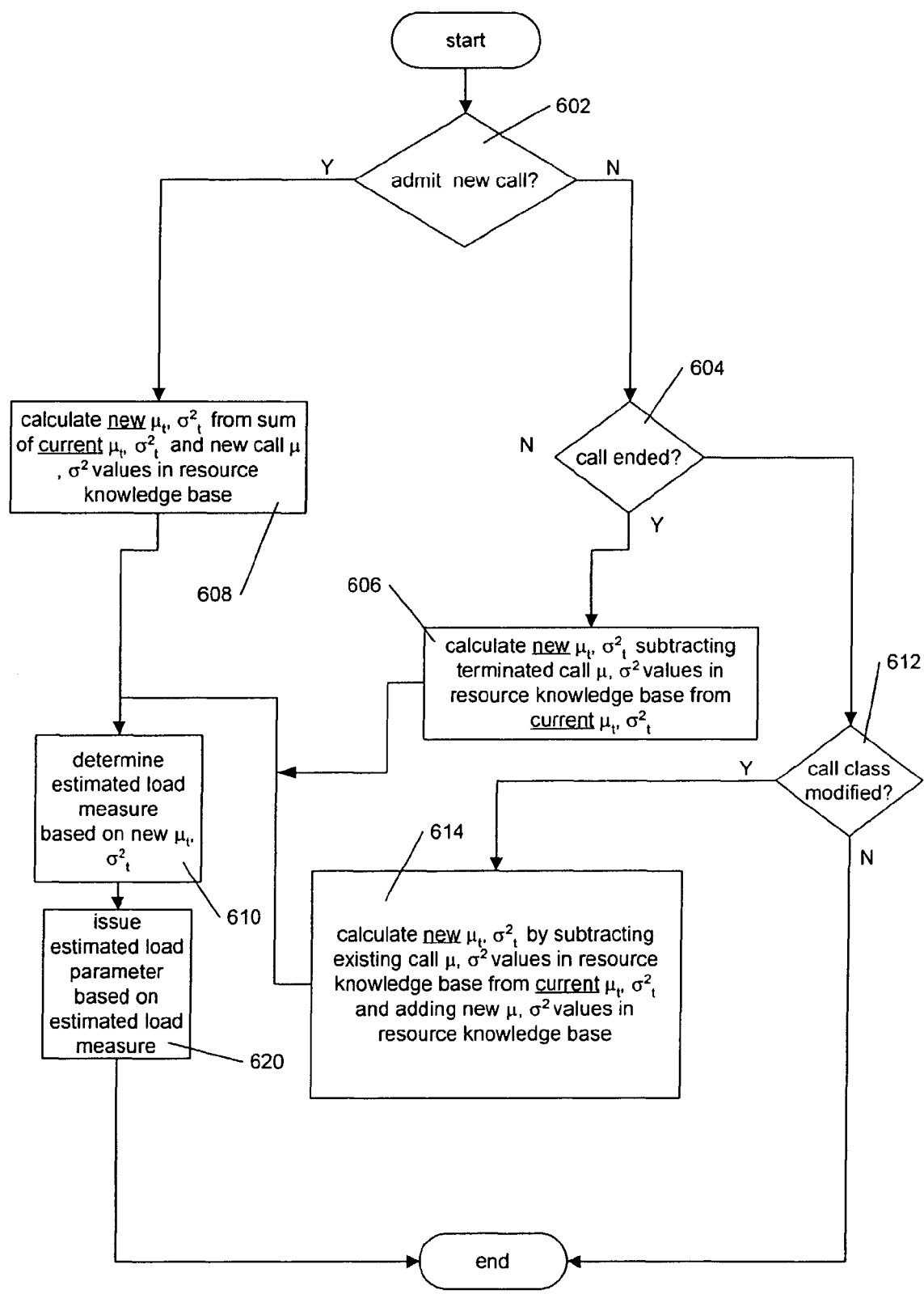
FIG. 6 is a flowchart illustrating load estimation processing according to an embodiment of the invention.

Turning now to FIG. 6, processing begins at step 602, in which a determination is made whether the detected call event involves a new call admission request. If so, control passes to step 608 in which a "new" estimated load mean and variance for the involved individual call processing unit, e.g. PMCp, is determined by adding the requested "new" call class ($\theta_x$) load mean $\mu$ and variance $\sigma^2$ values to the current estimated load mean ($\mu_t$) and variance ($\sigma^2_t$) values for the entire PMCp as specified in the resource knowledge base corresponding to the PMCp. It should be noted that this is made possible through application of the central limit Theorem discussed above. Thereafter, control passes to step 610 in which the load estimator determines the estimated load measure (e.g. $\zeta(p)$ or $x_2(p)$) based on the new estimated load mean and variance values calculated in step 608.

If, however, in step 602, a determination is made that the detected call event does not specify a new call admission request, control instead passes to 604. In step 604, a determination is made whether the detected call event specifies an admitted call termination request. If so, control passes to step 606, in which the new mean and variance values for the estimated load are calculated by subtracting the class load mean and variance values associated with the terminated call, as contained in the corresponding resource knowledge base, from current estimated load mean and variance values. Thereafter, control passes to step 610, where again the estimated load measure is determined based on the new mean and variance values for the estimated load as calculated in step 606.

If, however, in step 604, a determination is made that the detected call event in step 604 does not specify an admitted call termination event, control instead passes to step 612. In step 612, a determination is made whether the detected call event specifies an admitted call class modification request. Call class modifications, such as in-process call upgrades or downgrades, can be specified for an admitted call. Examples include requesting a call type modification (such as from voice to data) for an existing call, a call class modification within a common type (such as from interactive data type call to a streaming data call or requesting a transition in class-specific call parameter (such as the toggling the presence or absence of ciphering in voice calls or changing the bit rate for data calls). If the detected event specifies a call class modification event, control passes to step 614, in which the new estimated load mean and variance values are calculated by first subtracting the existing call class load mean and load variance values as specified in the resource knowledge base for the call currently undergoing modification and subsequently adding the new class mean and load variance values in the resource knowledge base specified for the call class the call of interest is evolving into. Control thereafter passes to step 610 in which again the estimated load measure based on the new estimated load mean and load variance for the entire processing unit is determined.

It should be noted that the estimated load measure may comprise any number of values suitable to quantatively represent the estimated load, including the aforementioned probability of exceeding a nominal load—$\zeta(p)$—or a ratio between the nominal load and the estimated load mean, equation $x_2(p)$ mentioned above. Alternatively, other expressions of the estimated load measure may be used as would be understood by those ordinarily skilled in the art.

Once the estimated load measure has been determined, control thereafter passes to step 620 in which an estimated load parameter corresponding to, or at least based on, the estimated load measure is issued by the load estimator of interest. The estimated load parameter is used by the PMCp and/or by the managing call processing unit PMC-M to help undertake eagerness determination and ultimately load balancing and call admission control according to the disclosed embodiments. Thereafter event driven load estimation updating terminates naturally.

Figure 7:
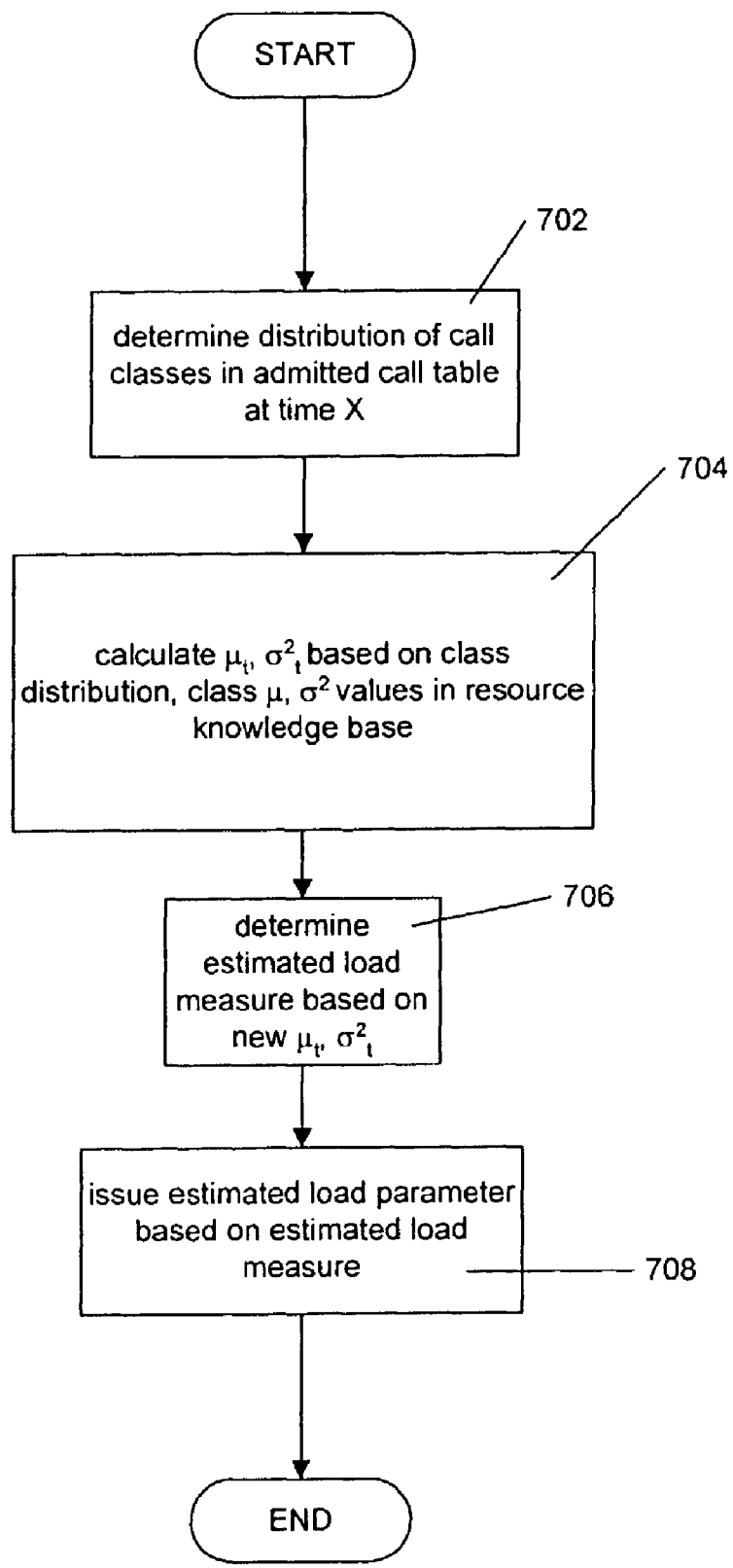
FIG. 7 is a flowchart illustrating load estimation processing according to an alternative embodiment of the invention.

Load estimation according to another embodiment of the invention will now be detailed with reference to the flowchart of FIG. 7. In this embodiment, current load estimation is calculated based on the call information contained in the admitted call table at a particular time (e.g. time X in the figure). Referring to FIG. 7, control initiates at step 702, in which a distribution of the call classes in the admitted call table (such as table at a given time X is made). This distribution identifies how many calls within a given call class are contained in the admitted call table. This distribution is used to help develop an estimated load mean and load variance value for the entire call processing unit based on the class distribution. Control thereafter proceeds to step 704, in which the estimated load mean ($\mu_t$) and variance ($\sigma^2_t$) for the entire call processing unit PMCp is calculated using the class distribution obtained in step 702 along with the class load mean and variance values contained in the resource knowledge base. In particular, this is done by multiplying the number of calls in the class as recorded in the class distribution by its associated class load mean and variance values contained in the resource knowledge base corresponding to the call processing unit of interest. This is done for each class represented in the class distribution calculated in step 702. Thereafter, in step 706, the estimated load measure (e.g. $\zeta(p)$ or $x_2(p)$) based on the new estimated load mean and new estimated load variance for the call processing unit PMCp is determined. As such, information may be used to generate the eagerness or willingness of the PMCp to accept new calls or call upgrades. Thereafter in step 708 in this embodiment, an estimated load parameter based on the aforementioned load measure is then issued for further processing, including eagerness determination for the PMCp of interest. Thereafter load estimation calculation according to this alternative embodiment terminates.

Eagerness determination processing according to an embodiment of the invention will now be detailed with reference to FIG. 8. In this embodiment, the eagerness $\phi(p)$ of a given individual call processing unit PMCp is generated with respect to fuzzy logic analysis of the actual load $x_1(p)$ and estimated load ($\zeta(p)$ or $x_2(p)$) parameters for the PMCp. In this embodiment, homogeneousness of the PMCp is not taken into consideration. Such eagerness processing may be conveniently undertaken within the PMCp itself, such as within the resource utilization and fuzzy logic units 1320, 1340 of the PMCi 1300 shown in FIG. 13. Alternatively, such processing may be carried out on the behalf of the PMCp by the master call processing unit, such as through the resource utilization and fuzzy logic units 1850, 1860 of the PMC-M 1800 shown in FIG. 18, although in such case input from the weighting engine 1640 would not be utilized, nor would $x_3(p)$ be realized by the resource utilization unit 1850.

Figure 8:
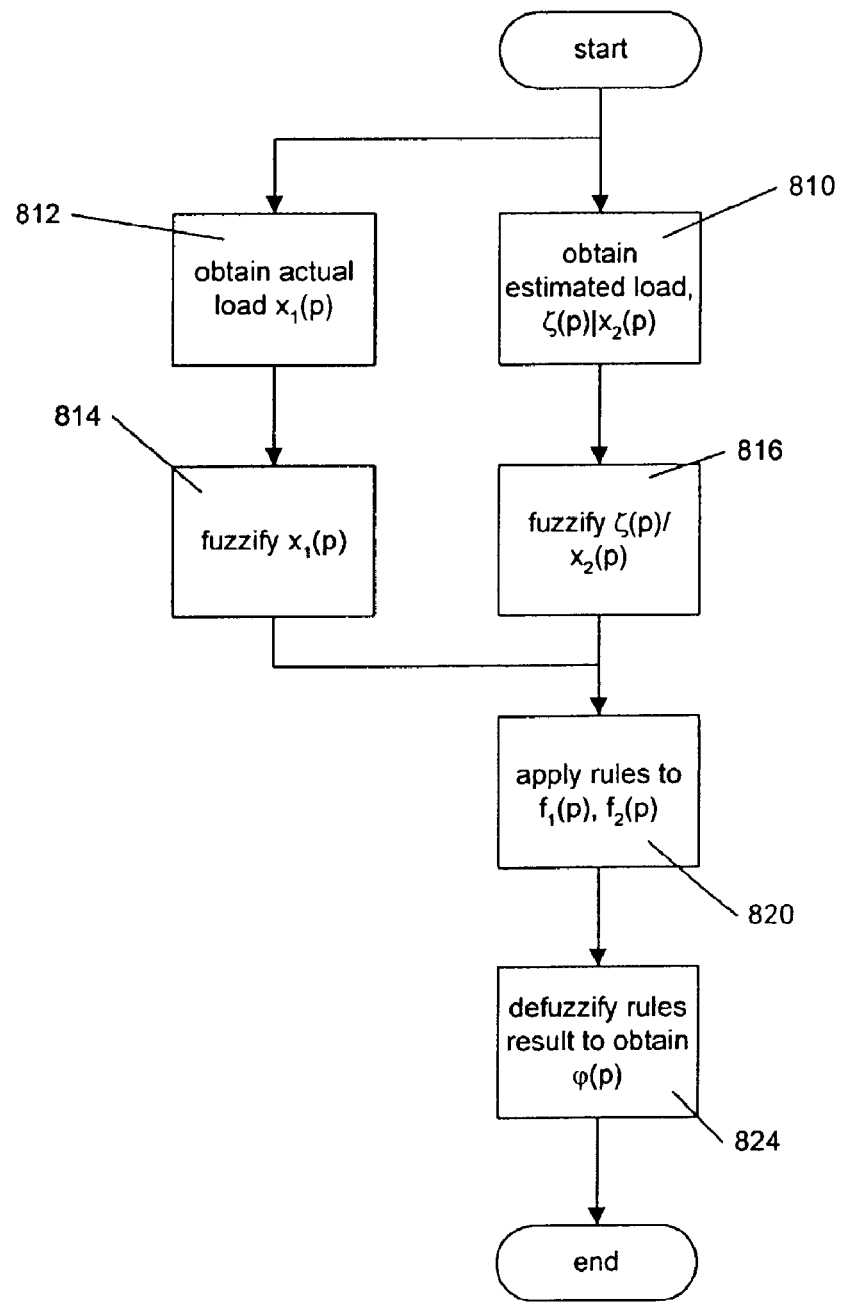
FIGS. 8, 9 and 10 are flowcharts illustrating eagerness determination processing according to respective alternative embodiments of the invention.
Figure 13:
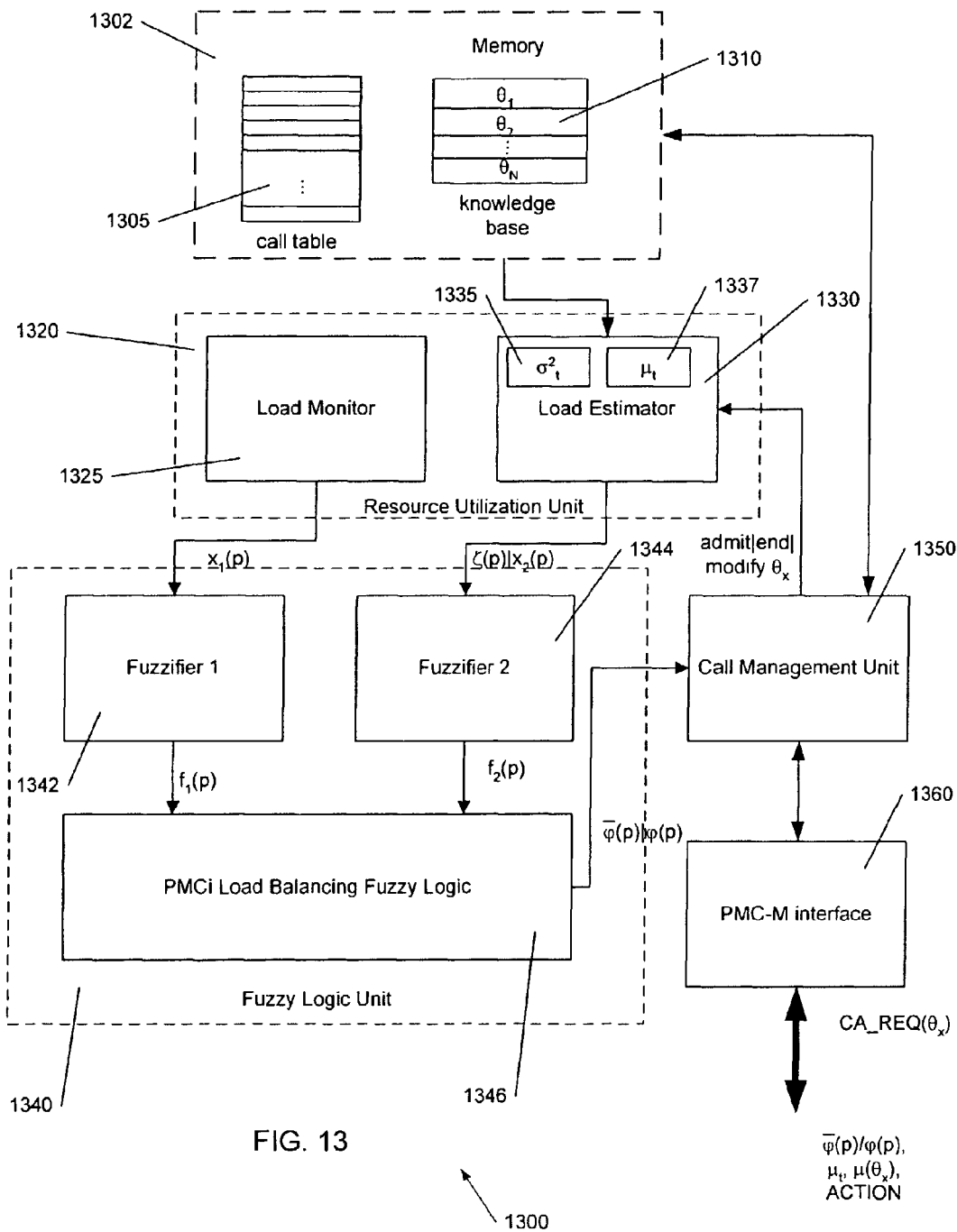
FIG. 13 is a simplified block diagram of a PMCi 1300 consistent with eagerness determination processing shown in FIGS. 8 and 9.

Turning to FIG. 8, eagerness processing within this embodiment begins at steps 812 and 810 in parallel, in which the actual load parameter $x_1(p)$ is generated by the e.g. the load monitor 1325 shown in FIG. 13 (step 812) and the estimated load parameter ($\zeta(p)$ or $x_2(p)$) is generated by e.g. the load estimator 1330 shown in FIG. 13 pursuant to load estimation described above with reference to FIG. 6 or 7. Control thereafter passes to steps 814 and 816 in parallel, where these actual and estimated load parameters are each fuzzified into respective fuzzy logic states representative of the conditions they quantify, such as through fuzzifier 1 1342 and fuzzifier 2 1344 respectively.

In particular, the first fuzzifier 1342 acts on the actual load parameter $x_1(p)$. For each PMCi(p), $x_1(p)$ is compared to $\Theta(p)$ which is the nominal load for the PMCp in terms of its information processing resources or CPU MIPS. A value of 0 for $x_1$ means absolutely no load; $x_1=\Theta$ means fully loaded. Referring to the membership response curve employed by the first fuzzifier 1342 shown in FIG. 19, $\Theta(p)$ 1960=450 MIPS, and five discrete membership states are specified: vl (very low) 1910 associated with a range between 0 and 150 MIPS, lo (low) 1920 ranging from 50 to 250 MIPS, me (medium) 1930 ranging from 150 to 350 MIPS, hi (high) 1940 ranging from 250 to 450 MIPS, and vh (very high) 1950 ranging from 350 to $\Theta(p)$. Note that utilizing measured load values normalized to the nominal load $\Theta(p)$ of the PMCp, where $x_1(p)/\Theta(p)$ ranges from 0 to 1 may be alternatively used with equal results, and may be advantageously implemented in a call processing environment including PMCis of mixed resource capacities (such as differing CPU resources). An efficient use of the PMCp resources dictates the need to keep $f_1(p)$ in "hi" region.

To simplify fuzzifier design in this embodiment, first fuzzifier 1342, along with the second fuzzifier 1344 and the third fuzzifier 1448 (FIG. 14) are designed such that: 1) at most two fuzzy variables will have non zero values for the same input; and that the sum of the membership functions of all fuzzy variables for each input value would be 1. However, other configurations can be used without departing from the teachings of the present invention.

Figure 19:
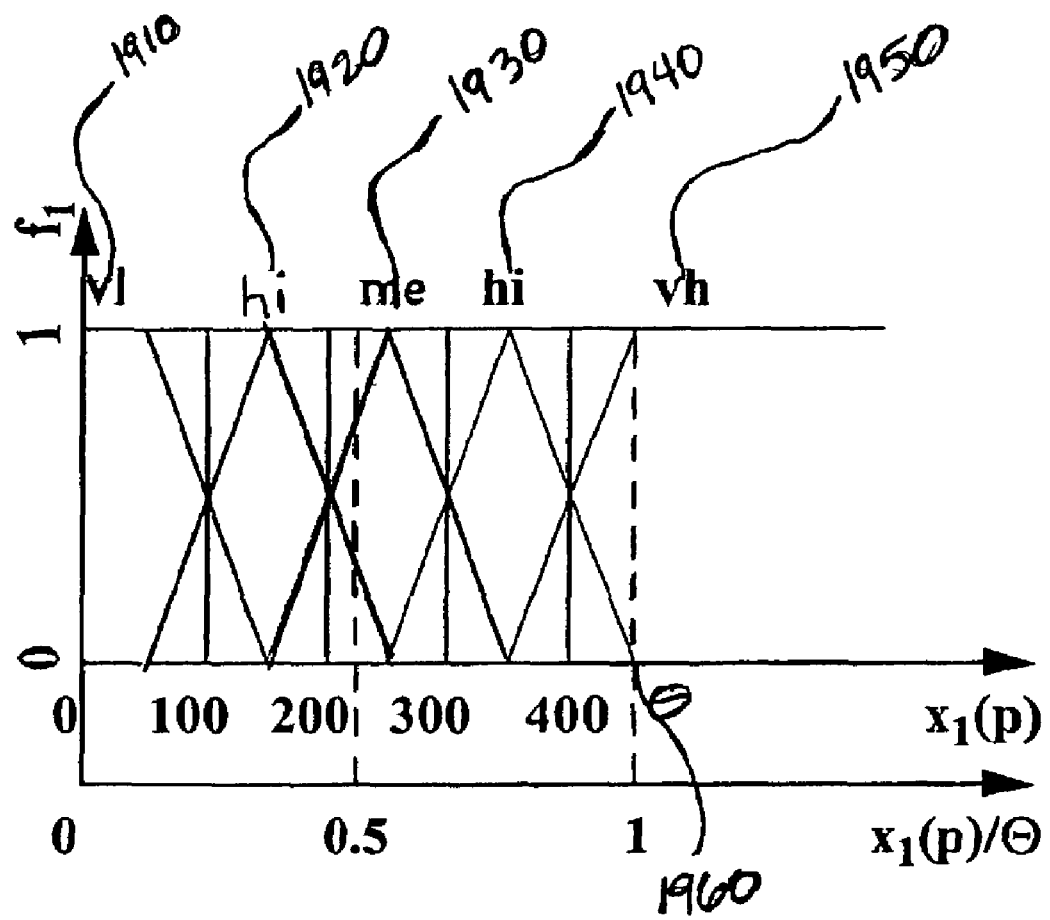
FIG. 19 diagrammatically illustrates fuzzification of the actual load parameters according to an embodiment of the invention.

Thus, referring to FIG. 19, assuming that $x_1(p)$=400 MIPS, the output $f_1(p)$ of the first fuzzifier 1342 would be $f_1(p)=\{(vl=0), (lo=0), (me=0), (hi=0.5), (vh=0.5)\}$.

Figure 20:
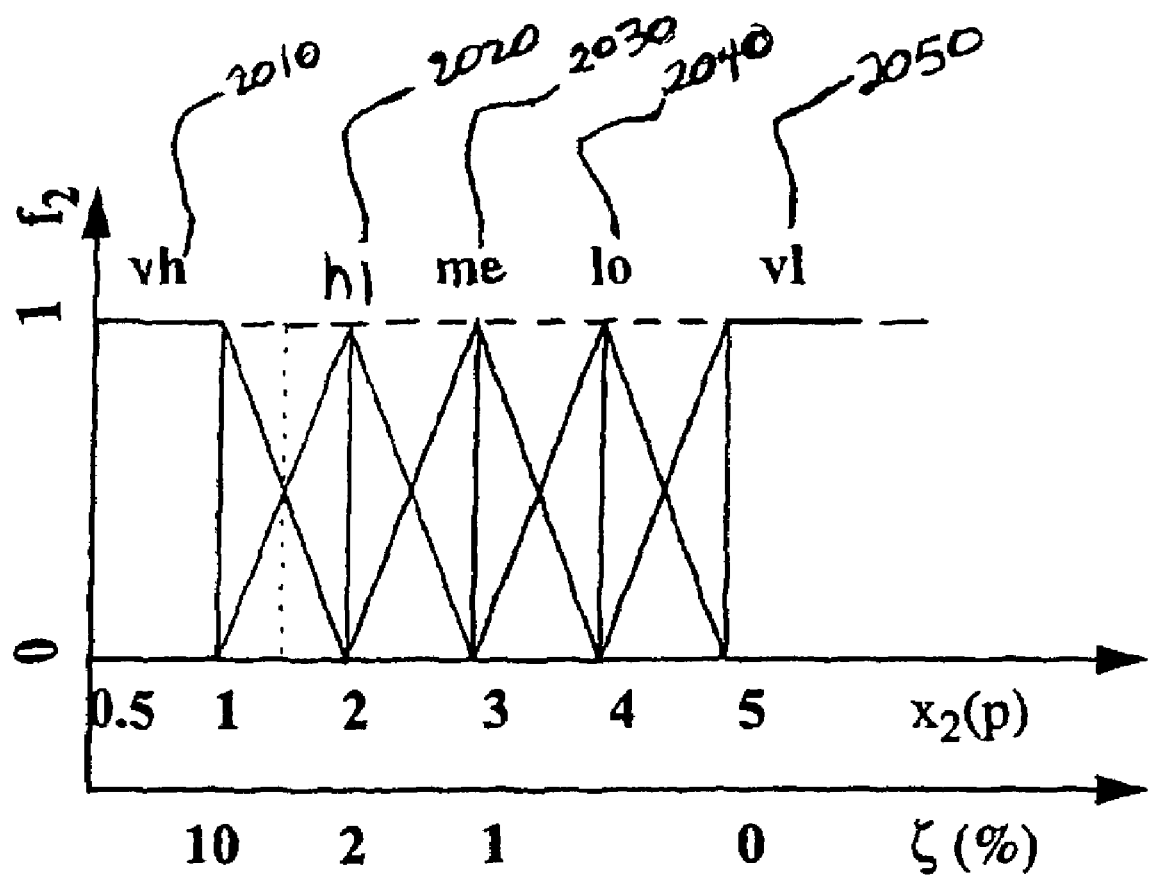
FIG. 20 diagrammatically illustrates fuzzification of the estimate load parameters according to an embodiment of the invention.

As shown in FIGS. 13 and 20, the second fuzzifier 1344 acts on the load estimation parameter $x_2(p)$, or, alternatively, the probability of exceeding the nominal load ($\zeta$) directly, where $\zeta$ itself is obtained from the Gaussian distribution error function explained above. To ease design of the second fuzzifier 1344, however, $x_2(p)$ may be preferred, wherein $x_2(p)=(\Theta-\mu_t)/\sigma_t$, where $\sigma_t$=standard deviation of $\mu_t$ or $|(\sigma^2_t)|^{1/2}$. Similar to FIG. 19, FIG. 20 illustrates the membership response curve for the second fuzzifier 1344, which again defines the five discrete membership states or fuzzy result values vh 2010, hi 2020, me 2030, lo 2040, and vl 2050. Here, if assuming that $\mu$=300 MIPS, $\sigma_t$=100 MIPS and $\Theta$=450 MIPS, $x_2(p)$=1.5, and $f_2(p)=\{(vh=0.5), (h=0.5), (me=0), (lo=0), (vl=0)\}$. Alternatively, the probability $\zeta$ in this instance=6.68%.

In another example, if $\zeta(p)$ is very small (approaching 0), $f_2(p)$ is "vl". In yet another example, if $x_2(p)$=4.5,$\zeta(p)$=3.39767 * $10^{-6}$ and then $f_2(p)$ is both "lo" and "vl" with a membership function of 0.5.

Figure 18:
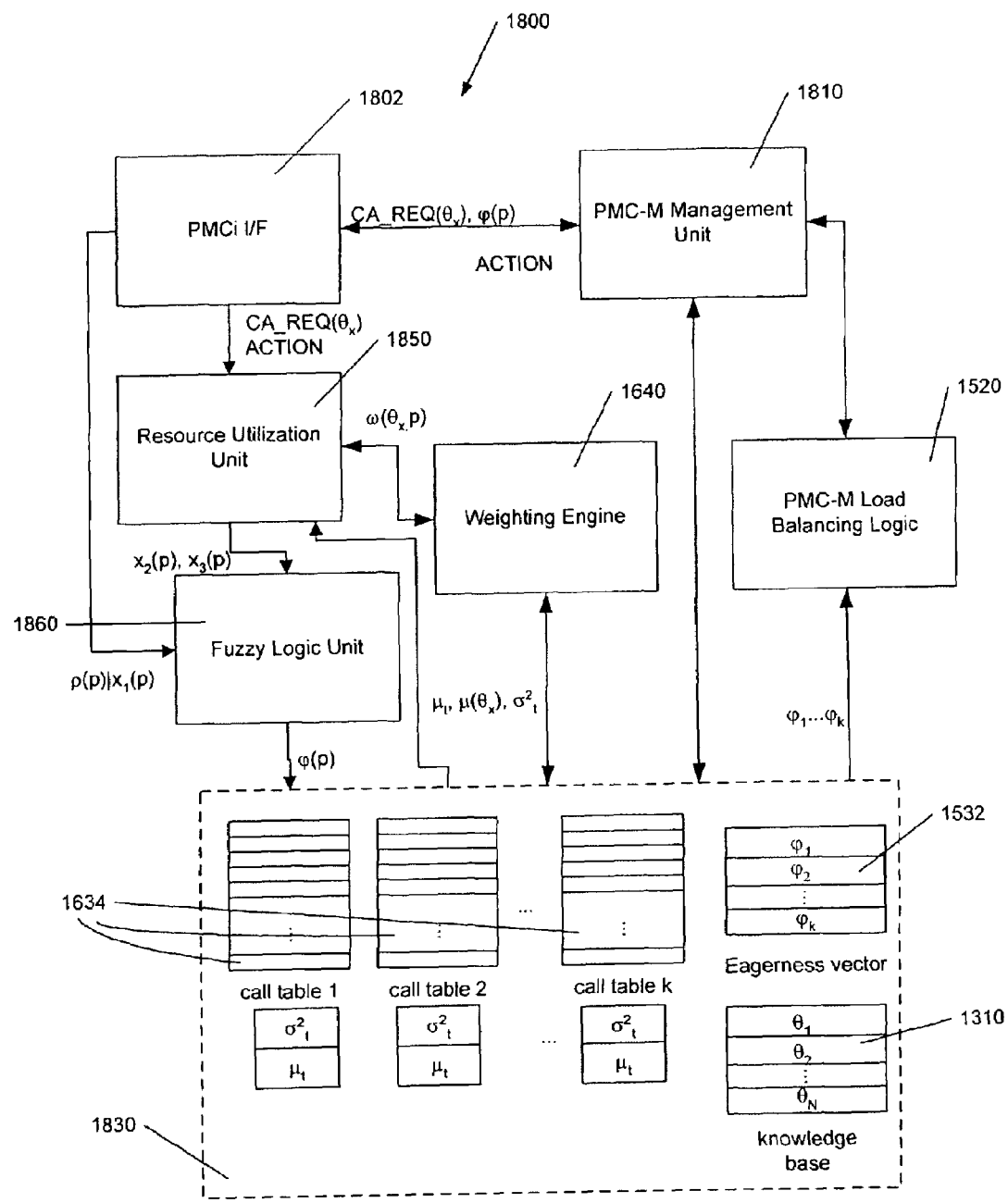
FIG. 18 is a simplified block diagram of a PMC-M consistent with the PMCi arrangement shown in FIG. 17.

Returning to FIG. 8, once fuzzification steps 814 and 816 have been carried out, control passes to step 820, wherein an inference mechanism such as a rules base, part of the PMCi load balancing fuzzy logic 1346 in FIG. 13 or the fuzzy logic unit 1860 of the PMC-M 1800 of FIG. 18, applies a finite series of rules against the possible combinations of the $f_1(p)$ and $f_2(p)$ in order to arrive at a rules result. E.g., if rule #0: if ($f_1$=vl) & ($f_2$=vl) then eagerness$_0$=1 . . . rule #R-1: if ($f_1$=vh) & ($f_2$=vh) then eagerness$_{R-1}$=0, where eagerness . . . , eagerness$_{R-1}$ are the rules results from the application of each individual rule. The final eagerness $\phi(p)$ is a weighted average of all rules. In this embodiment, though not required, for each combination of $f_1(p)$ and $f_2(p)$, there is one rule specified. FIG. 24 illustrates, in the form of a lookup table, rules results based on the possible combinations of $f_1(p)$ and $f_2(p)$. Here, an individual rules result approaching 1 indicates that the PMCi is very eager to accept a new call or call upgrade, and an individual rules result approaching 0 indicates that the PMCi of interest is not eager at all to accept a new call or call upgrade. Dashed line 2410 represents the threshold to the right of which the individual PMCi(p) decides to reject the call admission or upgrade. The rules are determined with a "common sense" logic, for each different case.

Still referring to the flowchart of FIG. 8, once the rules results are obtained in step 820, these rules results are "defuzzified" to obtain the eagerness of accepting a new call or a call modification upgrade $\phi(p)$, which again may be conveniently carried out by the fuzzy logic units 1316, 1860. In particular, an averaging algorithm called "centroid defuzzification" may be utilized (also known as "center of gravity" defuzzification). The formula for the defuzzification is as follows:

$$\phi(p) = \frac{\sum_{i=1}^{R} b_i x \gamma(i)}{\sum_{i=1}^{R} \gamma(i)} \quad (15)$$

where $b_i$ is the center of the membership function recommended by the consequent of rule i; $\gamma(i)$ is the certainty of rule i; R is number of rules.

$$\gamma(i) = \prod_{j=1}^{L} f_i(j) \quad (16)$$

where $f_i(j)$ is the membership (fuzzified value) of the input j to the condition of rule i and L is the number of conditions to each rule (the same as the number of inputs of the fuzzy logic; 2 in our case). Because of our assumption that the sum of memberships for any given input is equal to one, this formula simplifies as:

$$\varphi(p) = \sum_{i=1}^{R} b_i x \gamma(i) \quad (17)$$

As a result, we can simply calculate the center of gravity of all the rules:

$$\varphi(p) = \frac{\sum_{i=0}^{R-1} \text{activation}(i) \times \text{eagerness}_i}{\sum_{i=0}^{R-1} \text{activation}(i)} \quad (18)$$

Where activation(i) denotes the product of the membership functions of the inputs of the rule i. For instance, activation(0)=$(f_1=vl)*(f_2=vl)$ activation(R-1)=$(f_1=vh)*(f_2\ vh)$ In either case, the final output is also a fuzzy variable, as a result, the eagerness has always a value between 0 and 1.

Once $\phi(p)$ is obtained, eagerness determination processing according to the embodiment of FIG. 8 terminates.

To illustrate further, consider the following example:

PMCp, where $\Theta$=450 MIPS, $\mu_t$=434.85 MIPS, $\sigma_t^2$=56.11 MIPS measured PMCp CPU load at time t=$x_1(p)$=270 MIPS $x_2(p)$ at time t=$(\Theta-\mu_t)/\sigma_t$=2.02 referring to FIG. 19, vector $f_1(p)$={0,0,0.6,0.4,0} referring to FIG. 20, vector $f_2(p)$={0,0,0.022,0.978,0} applying rule combinations of FIG. 24, the following activation results are implicated (i.e., nonzero result):

$(f_1=me)*(f_2=me)$=0.6*0.022=0.013

$(f_1=me)*(f_2=hi)$=0.6*0.978=0.587

$(f_1=hi)*(f_2=me)$=0.4*0.022=0.009

$(f_1=hi)*(f_2=hi)$=0.4*0.978=0.391 applying equation (18), $$\phi(p) = \frac{0.013*(0.5) + 0.587*(0.3) + 0.009*(0.3) + 0.391*(0.2)}{0.013 + 0.587 + 0.009 + 0.391} = 0.26 \quad (19)$$

It should be noted that in the embodiment of FIG. 8, steps 810 and 812, and steps 814 and 816 are shown executing respectively in parallel. However, the teachings of the invention are not intended to be so limited, and in fact nonparallel execution of these steps can occur as long as $f_1(p)$ and $f_2(p)$ can be obtained such that rules can be applied to their combination as described above without either becoming stale.

Eagerness determination processing according to an alternative embodiment of the invention will now be detailed with reference to FIG. 9. In this embodiment, the homogeneousness of the given individual call processing unit PMCp load is ascertained along with fuzzy logic anaylsis of the actual load and estimated load parameters for the PMCp as described above with reference to FIG. 8. Eagerness determination according to this embodiment may be conveniently performed by the resource utilization 1320 and fuzzy logic unit 1340 of the PMCi 1300 shown in FIG. 13 in combination with the homogeneousness realization 1650 and eagerness determination unit 1660 of the PMC-M 1600 shown in FIG. 16, although other configurations may be utilized, as will be recognized by those of ordinary skill in the art.

Figure 9:
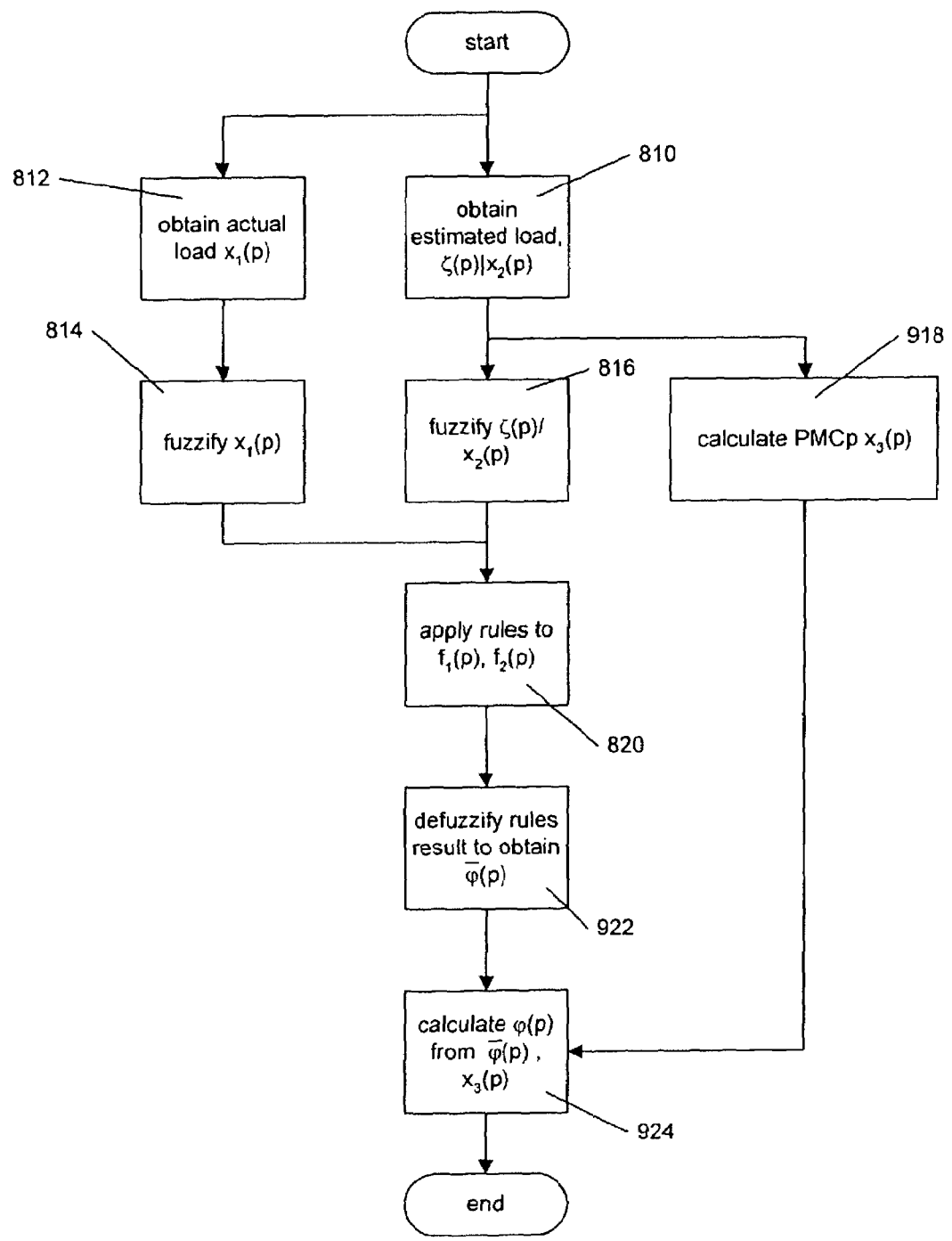

In comparing the embodiment shown in FIG. 9 to the embodiment described above with reference to FIG. 8, the following differences are noted. First nonhomogeneousness or the related parameter $x_3(p)$ in step 918 of FIG. 9 is calculated, here in parallel with fuzzification of the actual and estimated loads (steps 814 and 816). Sequencing this after step 810 is important since homogeneousness or $x_3(p)$ is dependent in part on the new estimated load mean $\mu_t$ calculated in step 810 as a precursor to obtaining either $x_2(p)$ or $\zeta(p)$. However, step 918 need not occur in parallel with either step 814 or 816 as shown in FIG. 9, and can occur at any point in time after the new estimated load mean is determined (such as by the load estimator 1330 shown in FIG. 13) and before the new eagerness value for the PMCp is determined (step 924).

Figure 16:
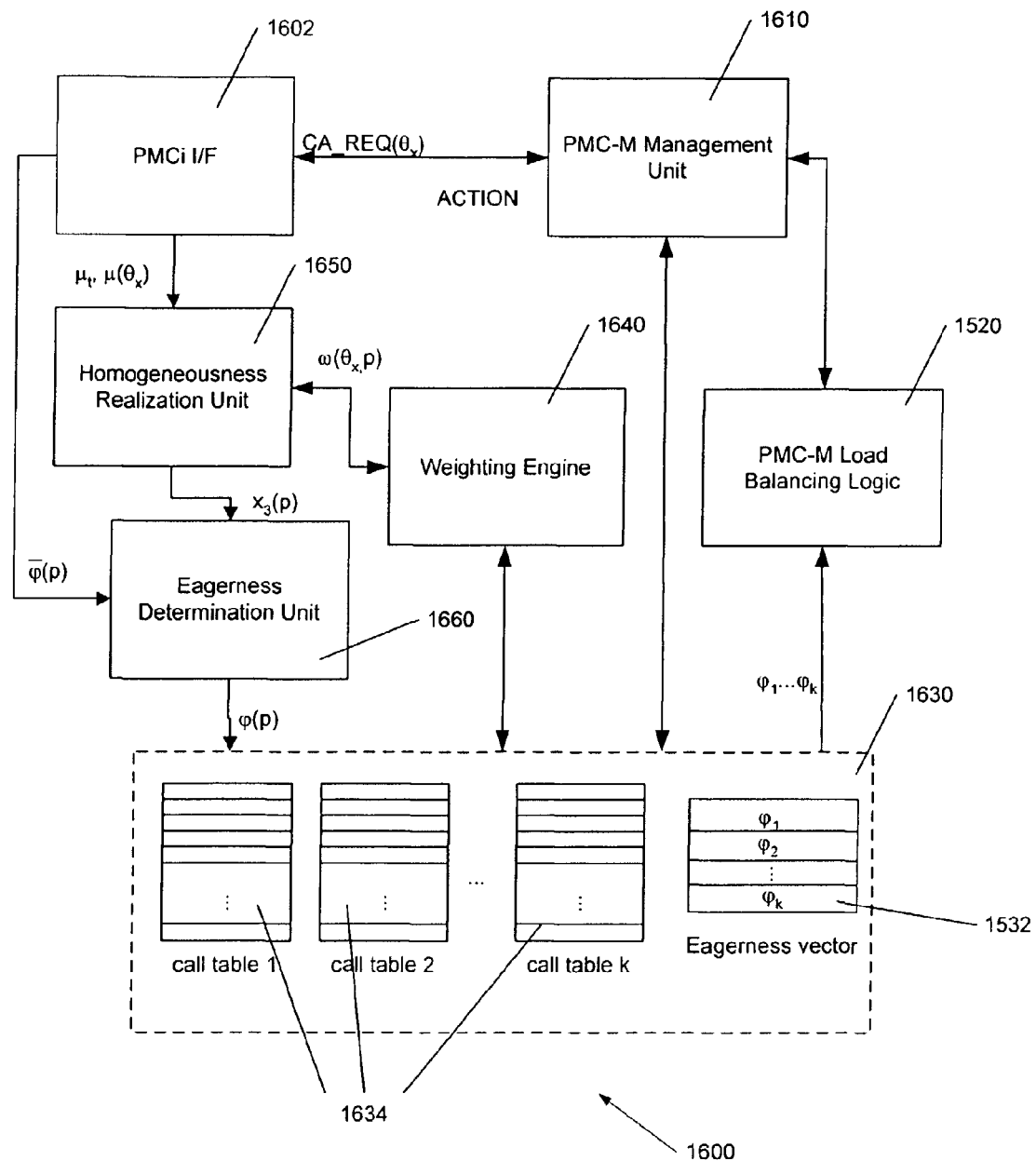
FIG. 16 is a simplified block diagram of a PMC-M 1600 consistent with the PMCi arrangement shown in FIG. 13.

The homogeneousness parameter, $x_3(p)$, is determined in accordance with the following equation: balance target for the new or upgraded call class minus the (new or upgraded call class mean/new estimated load mean for the PMCp), or $\omega(\theta_x) - \mu(\theta_x)/\mu_r$. The balance target is the ratio of the number of calls in class $\theta_x$ to the total number of calls in the call processing system managed by the master call processing unit, such as PMC-M 1600 shown in FIG. 16. It should be noted that in order to obtain a valid balance target $\omega(\theta_x)$, the PMC-M should have access to the admitted call tables for every PMCi it services (including the PMCp), if not a copy locally accessible to it, such as admitted call tables 1634 contained in local memory 1630. As shown in FIG. 16, a weighting engine 1640 forming part of the PMC-M may be utilized to maintain and update balance targets $\omega$ for all supported call classes and current state of all PMC1 . . . PMCk admitted call tables. When needed for homogeneousness parameter determination or otherwise, particular balance target information for a call class of interest, such as one for a new call or an upgraded existing call, may be issued by the weighting engine to a homogeneousness realization unit (such as unit 1650 within PMC-M 1600 or unit 1435 forming part of the resource utilization unit 1420 for the PMCi 1400 shown in FIG. 14.

Ideally, $x_3(p)$ should approach 0, so that the ratio of class $\theta_x$ to the total number of calls being handled by the PMCp matches the overall ratios experienced by the entire call processing system, from which $\omega(\theta_x)$ is derived. If $x_3(p) < 0$, this means that the PMCp has more than the average number of admitted calls of class $\theta_x$, and admission of the new or upgraded call of class $\theta_x$ should be rejected or at least disadvantaged. Conversely, if $x_3(p) > 0$, this means that the PMCp has less than the average number of admitted calls of class $\theta_x$, and the admission of the new or upgraded call of class $\theta_x$ should be encouraged.

Figure 14:
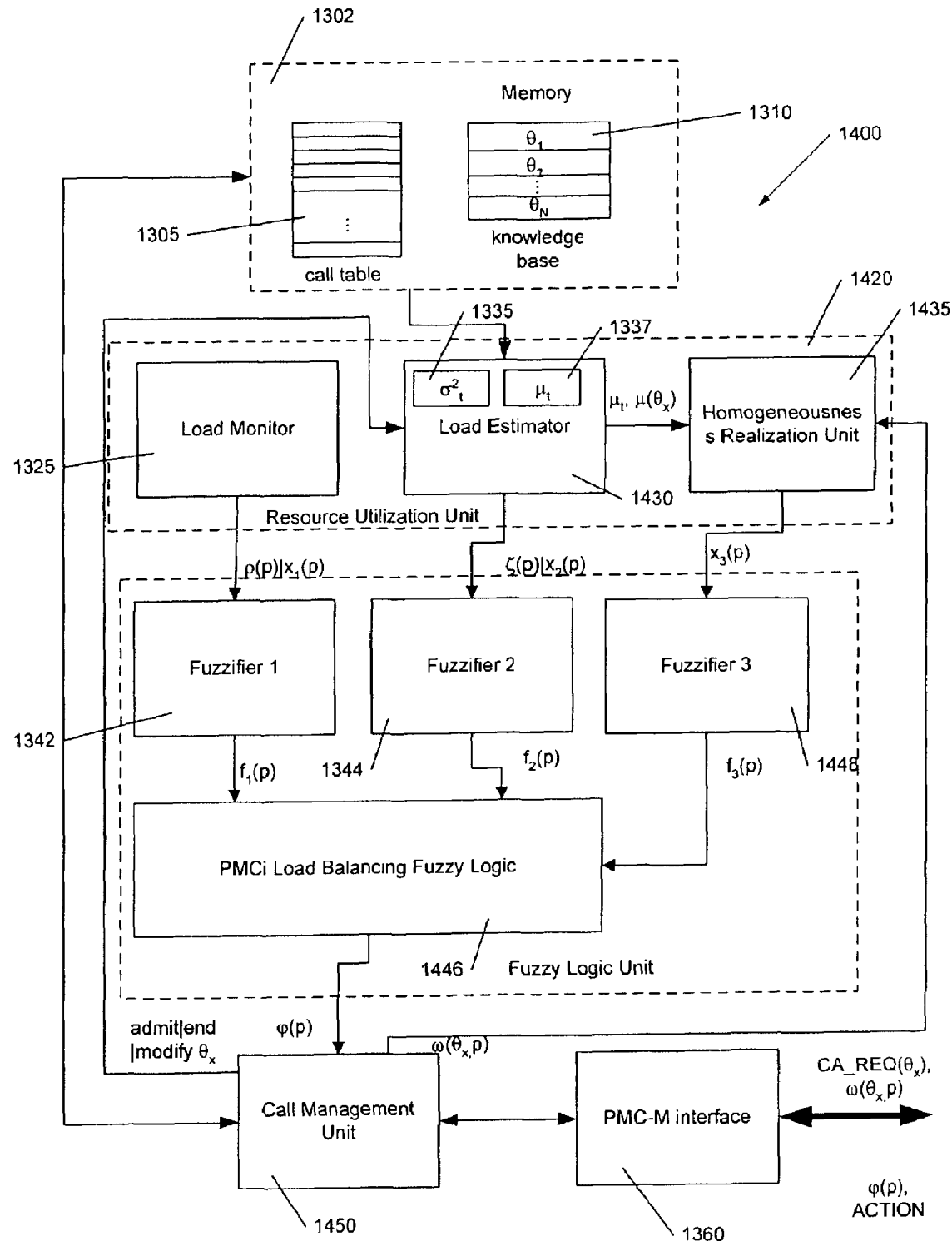
FIG. 14 is a simplified block diagram of a PMCi 1400 consistent with eagerness determination processing shown in FIG. 10.

Determination of homogeneousness as specified in step 918 may be conveniently implemented by a homogeneousness realization unit adapted to calculate $x_3(p)$ as discussed above. This homogeneousness realization unit may be situated onboard the PMCp for which eagerness is being determined, as is best shown in FIG. 14 through homogeneousness realization unit 1435 accepting the new estimated load mean and new or upgraded call class mean (contained in the resource knowledge base 1310) from the load estimator 1430 local to such PMCp). In such case, the $\omega(\theta_x)$ is sent from the PMC-M including the aforementioned weighting engine, such as PCM-M 1800, to the PMCp. In the alternative, as shown in FIG. 16, where the PMCp sends the new estimated load mean and new or upgraded call class mean to the PMC-M to permit such realization to occur.

As for further differences with the embodiment of FIG. 8, eagerness determination processing according to the embodiment of FIG. 9 also includes obtaining an intermediate eagerness $\bar{\phi}(p)$ in step 922, followed by final $\phi(p)$ which takes into account $\bar{\phi}(p)$ and the aforementioned $x_3(p)$ calculated in step 918. In this embodiment, a simple linear function of $\bar{\phi}(p)$ and $x_3(p)$ is used to obtain $\phi(p)$, such as:

$$\phi(p) = A*\bar{\phi}(p) + (1-A)*x_3(p) \quad (20)$$

where A=positive constant between 0 and 1, e.g. A=0.9

Figure 10:
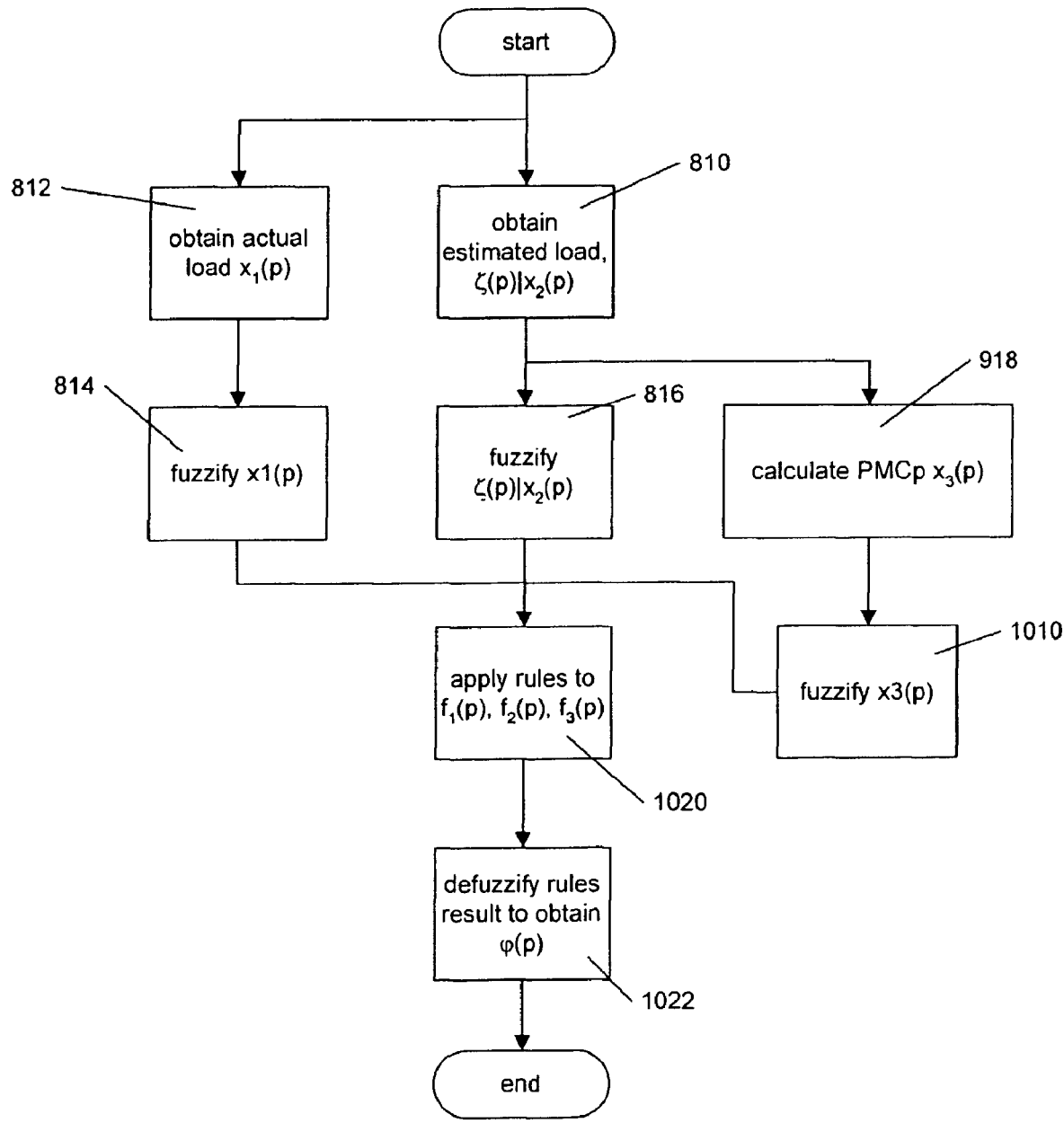
Figure 21:
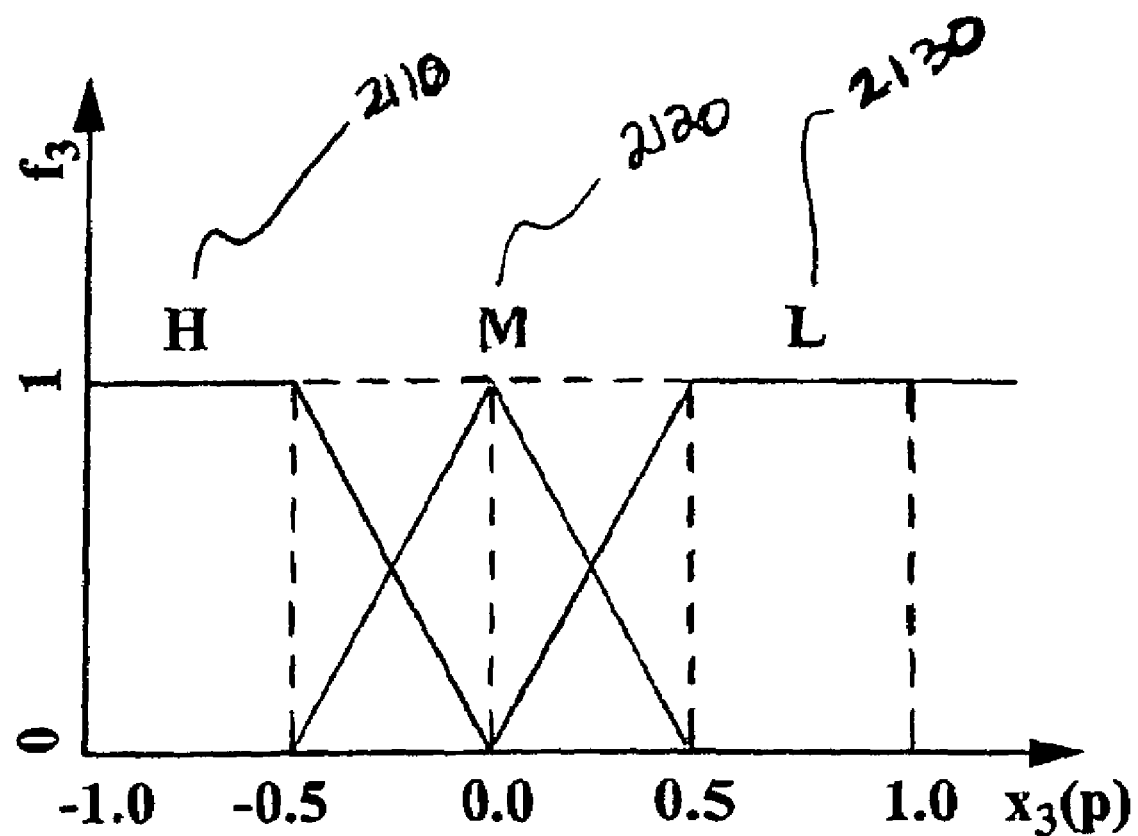
FIG. 21 diagrammatically illustrates fuzzification of the homogeneousness parameters according to an embodiment of the invention.

Eagerness determination for an individual call processing unit according to yet a further alternative embodiment will now be detailed with reference to FIG. 10. Processing according to this embodiment differs from processes previously described with reference to FIGS. 8 and 9 in that homogeneousness is also fuzzified (step 1010) with respect to a 3 membership state (H 2110 "high" to indicate that the ratio of calls of class $\theta_x$ being handled by the PMCp exceeds the $\theta_x$ balance target average for the entire call processing system, M 2120 "medium" to indicate that this ratio within the PMCp is approaching the balance target, L 2130 "low" means that the PMCp is handling fewer calls of class $\theta_x$ than average for the entire call processing system) fuzzification response curve shown in FIG. 21. Once fuzzification of all three parameters has been performed, including the actual load parameter $x_1(p)$ (step 814), the estimated load parameter $x_2(p)$ (step 816) and the homogeneousness parameter $x_3(p)$ (step 1010), the rules base is applied to all three fuzzified parameters in step 1020. The following table illustrates such a rules base, if $f_1(p)$ and $f_2(p)$ are simplified to 3 member states each as well:

| $f_1$ | L | | | M | | | H | | |
|---|---|---|---|---|---|---|---|---|---|
| $f_2$ | L | M | H | L | M | H | L | M | H |
| $f_3$ | | | | | | | | | |
| L | 1 | 0.75 | 0.5 | 1 | 0.75 | 0.25 | 0.5 | 0.25 | 0 |
| M | 1 | 0.5 | 0 | 0.75 | 0.5 | 0 | 0.25 | 0 | 0 |
| H | 0.25 | 0.25 | 0 | 0.25 | 0.25 | 0 | 0 | 0 | 0 |

Thereafter in step 1022 the rules result to fuzzify to directly obtain the new eagerness value $\phi(p)$ for the individual call processing unit (step 1022). Thereafter, eagerness determination processing according to the embodiment of FIG. 10 ends.

It should be noted that the individual call processing unit arrangement shown in FIG. 14 may conveniently implement the processing described above with reference to FIG. 10. Alternatively, such processing may occur within the managing call processing unit such as that shown in FIG. 18 on behalf of the given individual call processing unit, assuming that the actual load for that call processing unit is made accessible to the PMC-M, such as through realization and transmission of the actual load $x_1(p)$ parameter by the individual PMCp to the PMC-M by the load monitor 1325 depicted in the PMCi 1700 shown in FIG. 17.

Figure 11:
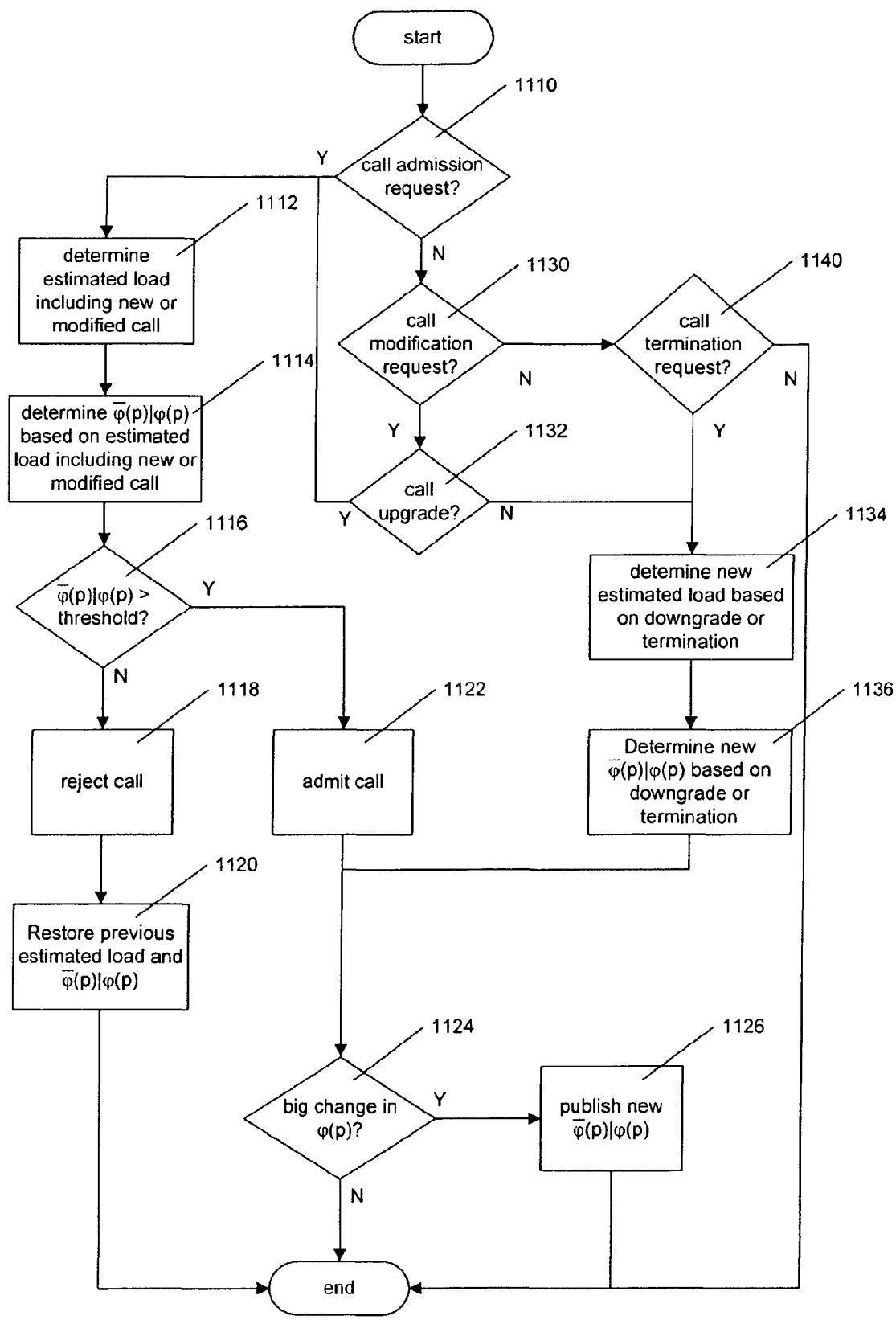
FIG. 11 is a flowchart illustrating PMCi call event processing according to an embodiment of the invention.
Figure 12:
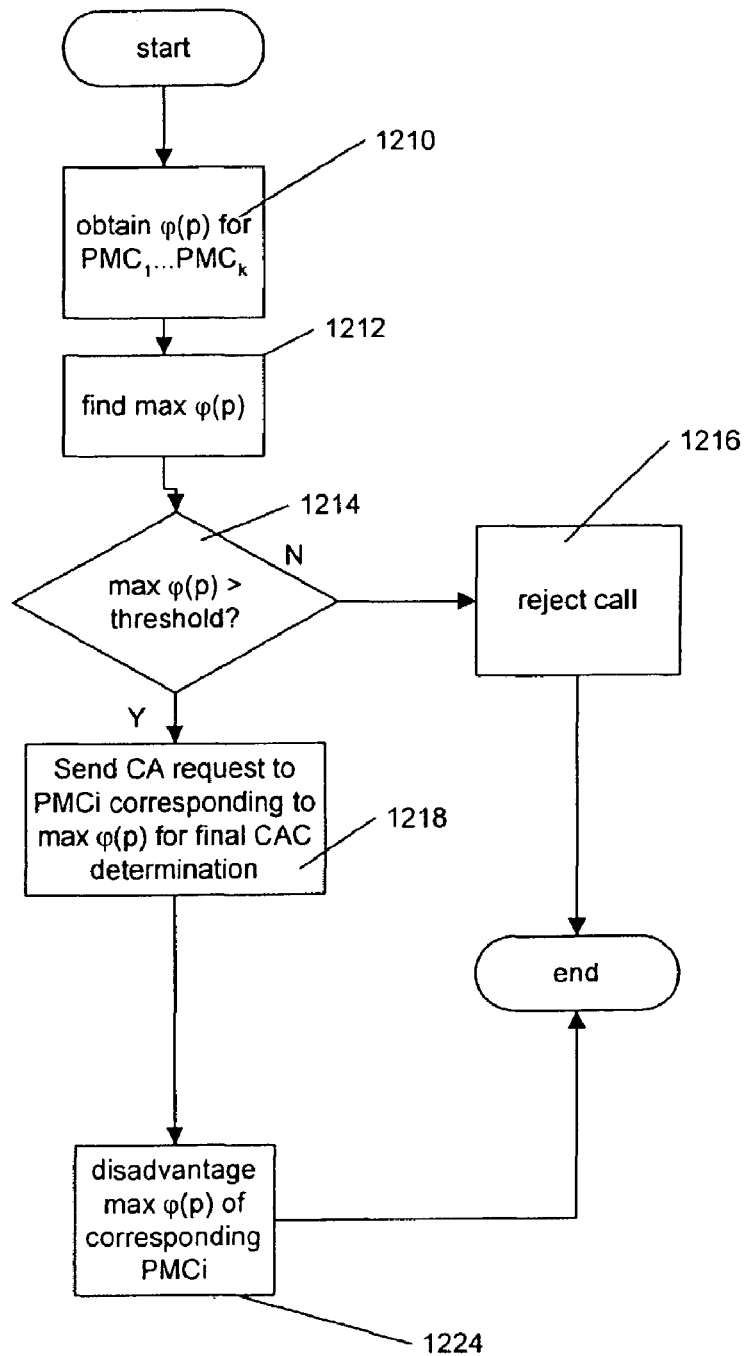
FIG. 12 is a flowchart illustrating PMC-M call admission processing according to an embodiment of the invention.
Figure 15:
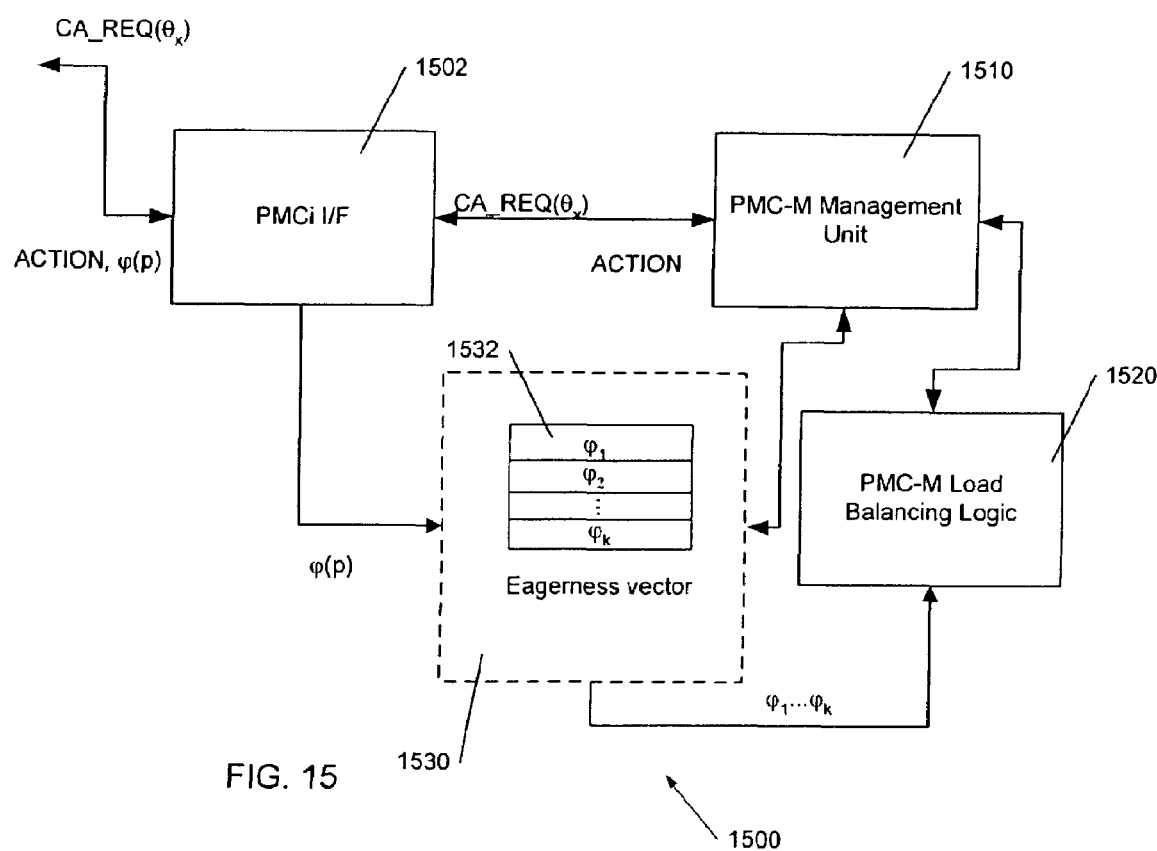
FIG. 15 is a simplified block diagram of a PMC-M 1500 consistent with the PMCi arrangements shown in FIGS. 13 and 14.

Call admission processing according to an embodiment of the invention will now be detailed with respect to the flowchart of FIGS. 11 and 12. In particular, early call admission control or early CAC is handled by managing call processing unit PMC-M for the entire call processing system based on current eagerness $\phi$ values for each of the individual call processing units PMCi constituting the call processing system and is shown and described with reference to FIG. 12. FIG. 11 illustrates call event, including call admission processing undertaken by a given one of the individual call processing units, including when the PMC-M identifies a potential PMCi for call admission based on early CAC processing. Turning first to the flowchart of FIG. 12, early CAC processing within the PMC-M begins at step 1210, in which upon detection of a call admission request, the PMC-M control logic, such as the PMC-M management unit 1510 (FIG. 15), 1610 (FIG. 16) or 1810 (FIG. 18) queries with the current eagerness values $\phi_1 \ldots \phi_k$ corresponding to each of the individual call processing units PMCi. It should be noted that in this embodiment, it is the responsibility of each PMCi to update its eagerness values as is appropriate to adequately apprise the PMC-M of its willingness to take on and manage a new call. However, in other embodiments consistent with the present invention, the PMC-M may prompt each PMCi for this eagerness information as needed or periodically as will become apparent to those ordinarily skilled in the art.

Figure 22:
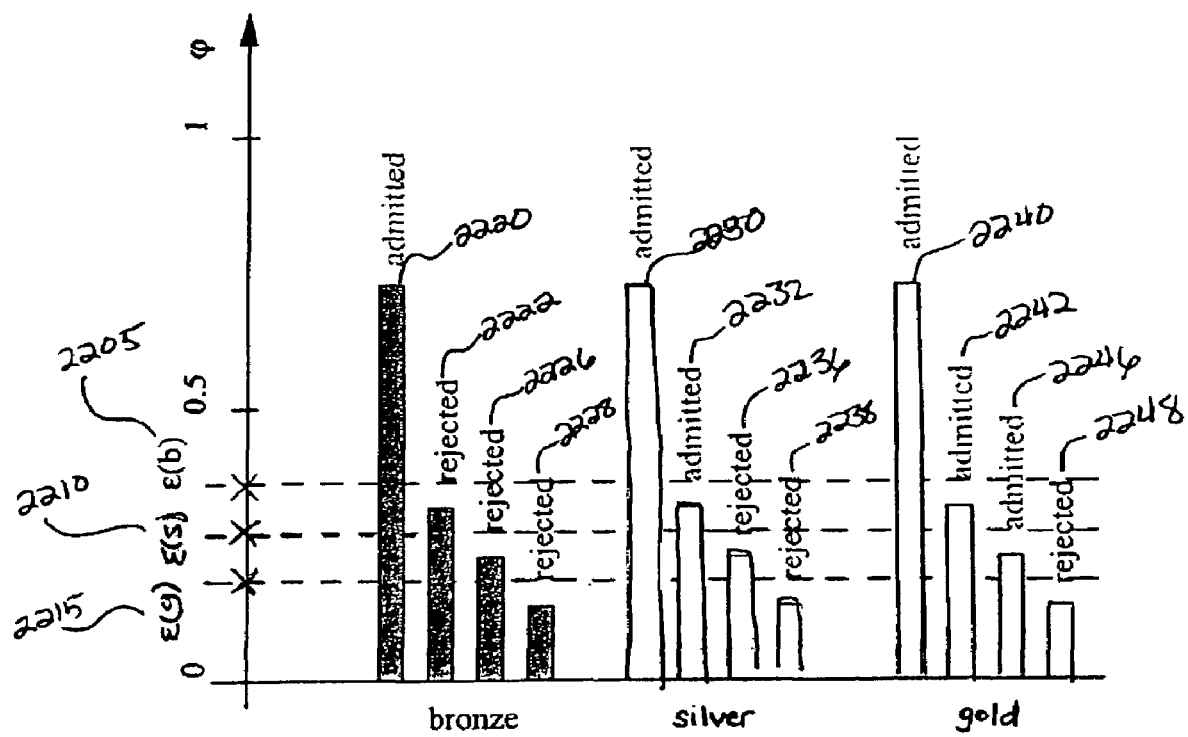
FIG. 22 illustrates threshold malleability by cost of service according to an embodiment of the invention.

Once these eagerness values are obtained, control thereafter passes to step 1212, in which the maximum relative eagerness value is determined based on the all the eagerness values (a.k.a. eagerness vector Φ) obtained in step 1210. Thereafter in step 1214, a determination is made whether the maximum eagerness value exceeds a threshold. This threshold can be a uniform threshold for any call or can be based on the type of call, its associated cost of service such as bronze, silver or gold, and or based on other factors such as originator status, intended recipient status, etc. For example, consider the threshold malleability chart of FIG. 22. Here, a bronze CoS call will not be admitted if the reported eagerness for any of the PMCis fails to exceed $\epsilon_B$, thus in eagerness situations 2222, 2226 and 2228 the call is rejected, but accepted in situation 2220. Looking at the chart in another way, if situations 2220, 2222, 2226, and 2228 graphically represent the reported eagerness vector Φ:ϕ1 ... ϕ4 at a given time, the only PMCi corresponding to reported eagerness 2220 will be available to confirm acceptance of the bronze class call.

Likewise, a silver CoS call will not be admitted if the reported eagerness for any of the PMCis fails to exceed $\epsilon_S$, so in situations 2236 and 2238 the silver class call is rejected, and in situations 2230 and 2232 it is accepted. And, a gold class call will only fail to be accepted where the reported eagerness for each of the PMCis fails to exceed the gold threshold $\epsilon_g$, such as in situation 2248.

Turning back to FIG. 12, if it is determined in step 1214 that this maximum eagerness value does exceed the specified threshold, control passes to step 1218. At step 1218, the call admission request under scrutiny is transferred to the PMCi exhibiting the maximum eagerness value. In particular, the eagerness value for such call processing unit is recalculated taking into account the call class specified by the call in the new call admission request. Eagerness and load estimate determination as described herein may conveniently be used to confirm the new eagerness value. Thus, the decision to ultimately admit the call pursuant to the call request rests not with the PMC-M here, but by the PMCi exhibiting the maximum eagerness to accept a new call. Control thereafter passes to step 1224.

At step 1224, the corresponding individual call processing unit's reported eagerness is disadvantaged such as by scaling its corresponding ϕ by a factor of 0.8-0.9 for at least one iteration. Control thereafter ends. It should be noted that this processing will restart with the disadvantaged ϕ replacing the previous maximum ϕ. In such way, a high probability that another PMCi will be selected, and it's eagerness will be self-confirmed, assuming that it's reported eagerness continues to exceed the threshold as performed in step 1214. As one can see, this process continues iteratively until the first of: (1) the maximum queried eagerness value fails to exceed a specified threshold; (2) eagerness to accept the call cannot be confirmed by any PMCi; or the CA request is withdrawn.

Though not shown in FIG. 12, alternative ways may be used to disadvantage unconfirmed PMCis, such as through removing them from further consideration for the current CA request, or for a longer duration as will be understood by those ordinarily skilled in the art.

Call event processing according to an embodiment of the invention undertaken by a PMCi such as the PMCi 1300 shown in FIG. 13 or the PMCi 1400 shown in FIG. 14 is now detailed with reference to the flowchart of FIG. 11. Processing begins at step 1110 upon receipt of a call event directed to a given one of the PMCis either internally from calls already admitted or by the managing call processing unit responding to a call admission request, as outlined above with reference to PMC-M processing described with reference to FIG. 12. If at step 1110, a determination is made that the call event includes a call admission request, control passes to step 1112. At step 1112, the PMCi undertakes determination of the estimated load which includes the new call, such through processing described herein with reference to FIGS. 6 and 7. Thereafter, in step 1114, an intermediate or final eagerness value for the PMCi based on this newly obtained estimated load in step 1112 is determined using e.g. eagerness determination processing described herein with reference to FIGS. 8, 9 or 10, based on the configuration and capabilities of the PMCi. At step 1116, the intermediate or final eagerness determined in step 1114 is compared against a threshold (similar if not the same as the threshold used by the PMC-M in step 1214 of FIGS. 12 and 22). If the new eagerness(which as noted above takes into account the new call) fails to exceed this threshold, control passes to step 1118 in which the new call is rejected by the current PMCi and previous estimated load values and eagerness values are restored to reflect the situation prior to consideration of the new call. Control thereafter terminates.

If however, in step 1116, it is determined that the new eagerness does in fact exceed the threshold, control instead passes to step 1122. At step 1122, the PMCi admits the call. Control then passes to step 1124, in which a determination is made whether the PMC-M should be apprised of the newly calculated eagerness value. There is a design goal in the present embodiment to reduce extraneous traffic between the PMC-M and the PMCis it manages, and one way to help achieve this goal is to reduce notification of reported eagerness changes when such changes are relatively small, particularly where the overall system is relatively insensitive to slight alterations in PMCi eagerness. Thus, in this embodiment, a determination is made in step 1124 whether the new eagerness value constitutes a big change from the previous eagerness value reported to the PMC-M. If so, control passes to step 1126 and the PMCi reports the new eagerness to the PMC-M and call admission event processing ends. However, if in step 1124 it is determined that the new eagerness does not represent a significant change from the previously reported eagerness for the current PMCi, call event processing ends without further reporting.

Figure 23:
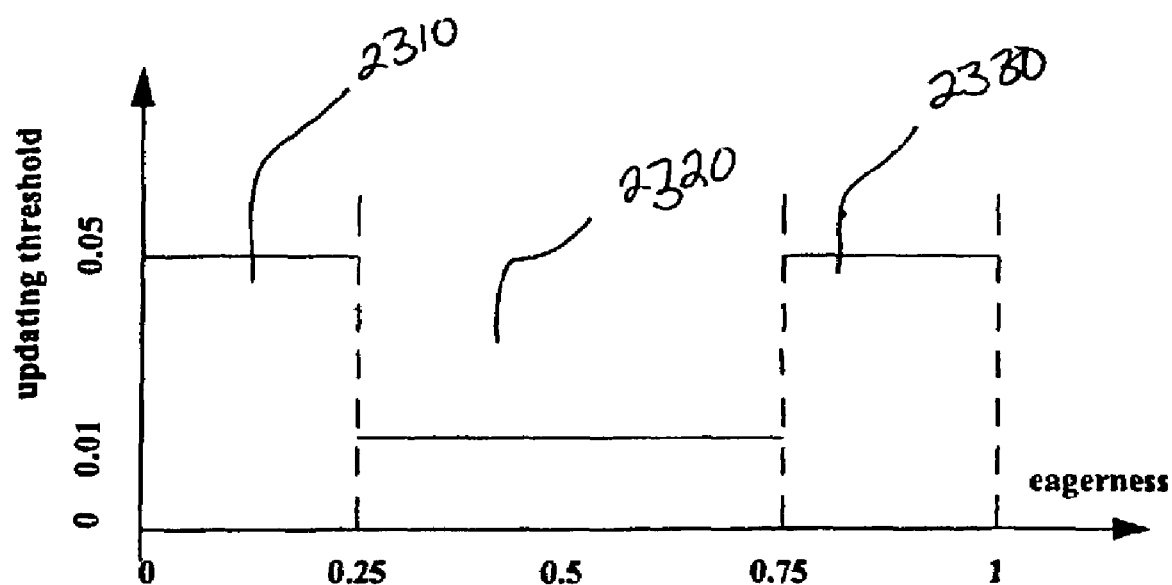
FIG. 23 illustrates eagerness reporting conservation according to an embodiment of the invention.

In determining whether the new eagerness constitutes a big change, a content-based messaging conservation algorithm may be used as depicted in FIG. 23. In this figure, if the new and previous eagerness both fall within region 2310(i.e. new and old ϕ(p)<0.25), the eagerness is determined not to be sensitive since the PMC-M will not consider the current PMCi for call admission anyway, as it fails to exceed the minimum threshold discussed above. Likewise, if the new eagerness and old eagerness both fall within region 2330 (i.e. new and old ϕ(p)>0.75), the current PMCi is deemed eager to admit calls anyway and so is not sensitive to the change. However, if the new eagerness or old eagerness falls in region 2320 (i.e. 0.25<new ϕ(p)or old ϕ(p) <0.75), the eagerness is deemed sensitive to the change and so the new eagerness is reported to the PMC-M. In other embodiments, other techniques may be used alternatively or in combination, such as thresholding the change in eagerness between old and new, reporting only after so many determinations, and the like.

Returning to FIG. 11, if the call event is not in fact a call admission request from the PMC-M, in accordance with FIG. 11 control passes to step 1130, in which a determination is made whether the call event for the current PMCi includes an admitted call class modification request. If so, control passes to step 1132, in which a further determination is made whether the call modification request specifies an upgrade or downgrade from a critical resource utilization perspective. If the modification request constitutes such an upgrade, control passes to step 1112 so that the current PMCi can self-determine whether it has sufficient resources to handle call upgrade using the aforementioned eagerness analysis detailed in steps 1112 to 1126 previously discussed. In this instance, however, the new estimated load is calculated with respect to a difference between the new and prior class characteristics for the call in which modification is requested.

If, however, in step 1132, it is determined that the call modification request specifies a call downgrade, control instead passes to step 1134 in which the new estimated load is determined based on the downgrade. Then, in step 1136, the new intermediate or final (depending on PMCi resource utilization capabilities) eagerness is re-determined taking into account the new estimated load obtained in step 1134. Thereafter, processing continues with the conditional publication or reporting steps 1124 and 1126 detailed above.

If, in step 1130, a determination is made that the intercepted call event does not comprise either a call admission request or an admitted call modification request, control passes to step 1140. At step 1140, a determination is made whether the call event includes an admitted call termination event. If so, control passes to step 1134 through 1126 detailed above, with the exception that the estimated load is recalculated without consideration of the terminated call. If, however, in step 1140, it is determined that the call event is not one of a call admission request, a call modification request, or a call termination request, the call event falls through to conventional call management processing (not shown in the FIG.), or in the alternative, is not recognized or acted upon at all by the PMCi of interest.

Turning briefly to FIG. 13, FIG. 13 depicts an individual call processing unit PMCi 1300 arrangement which includes a resource utilization unit 1320 and fuzzy logic unit 1340 capable of determining intermediate or final eagerness values based on actual and estimated load parameters. As such, the PMCi 1300 may conveniently implement estimated load processing discussed above with reference to FIGS. 6 and 7, and eagerness determination according to embodiments shown in FIGS. 8 and 9. In the case of eagerness determination consistent with FIG. 9, the PMCi 1300 coordinates with a PMC-M capable of determining a final eagerness including homogeneousness realization, such as PMC-M 1600 shown in FIG. 16. In the case of eagerness determination consistent with the embodiment of FIG. 8, the PMCi 1300 self determines a final eagerness which may then be reported to a PMC-M such as PMC-M 1500 shown in FIG. 15.

FIG. 14 illustrates an alternative PMCi 1400 arrangement which includes on-board homogeneousness realization and fuzzification consistent with the present invention. As such, the PMCi 1400 may conveniently implement eagerness determination consistent with the embodiment shown in FIG. 10, and may coordinate results with any PMC-M including a mechanism for generating and managing balance targets, such as PMC-M 1600 (FIG. 16) or PMC-M 1800 (FIG. 18).

Figure 17:
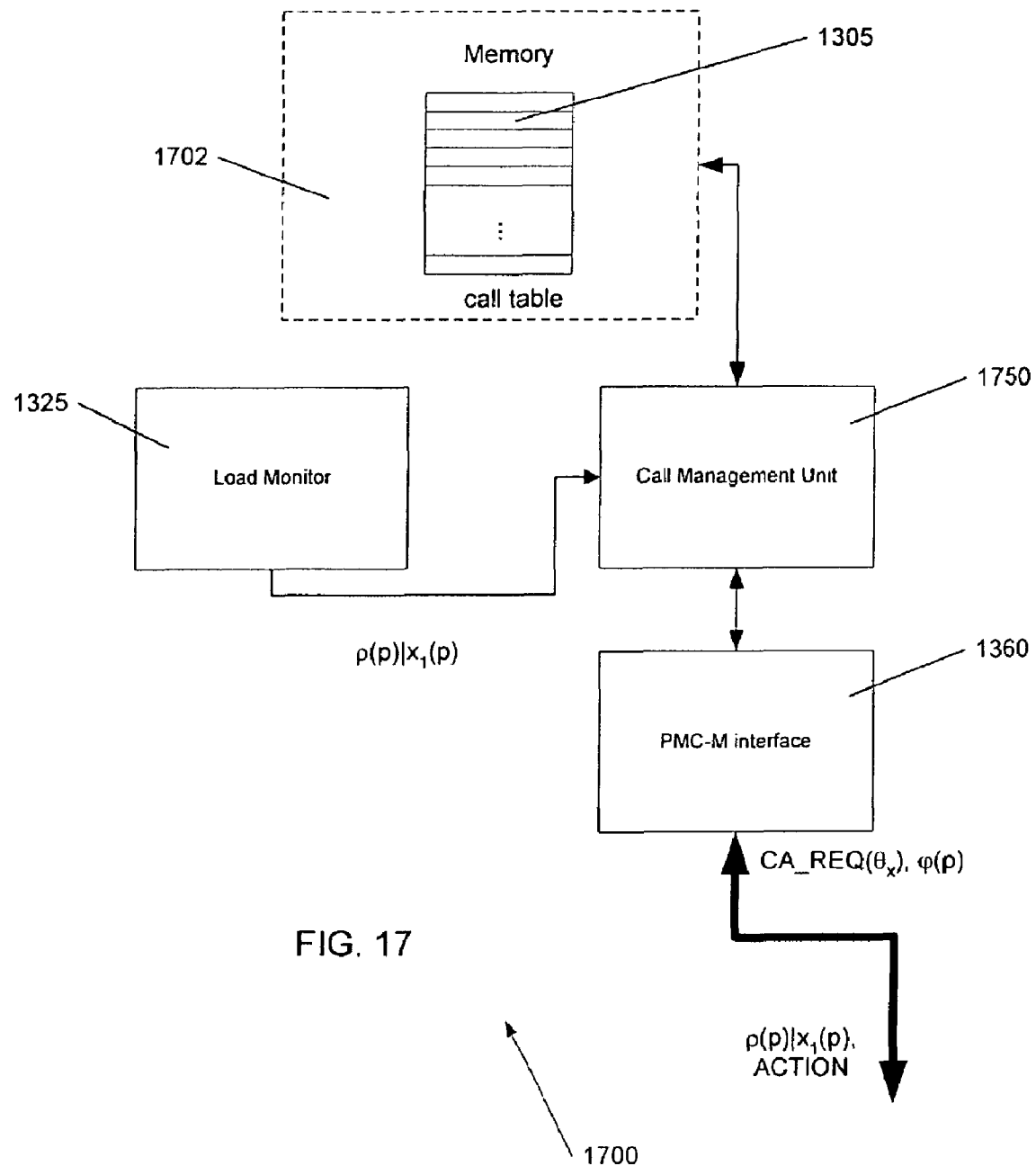
FIG. 17 is a simplified block diagram of a PMCi consistent with the PMC-M arrangement shown in FIG. 18.

FIG. 17 illustrates yet another alternative PMCi 1700 arrangement in which the PMCi 1700 does not include any fuzzy logic for load balancing or call admission control but does include a load monitor 1325 capable of obtaining x1(p) as described above. It is contemplated that in this embodiment, such load balancing and call admission control functionality will be undertaken by the managing call processing unit, such as the PCM-M 1800 shown in FIG. 18.

It will be obvious to those having skill in the art that many changes may be made to the details of the above-described embodiments of this invention without departing from the underlying principles thereof. For example, the processing described above may be conveniently implemented by one or more general (e.g. a microprocessor or microcontroller) or specific purpose information processors (e.g. a network processor or DSP) programmed to undertake one or more of the involved processing steps. That is, the present invention can be embodied as a computer program product comprising computer readable program code causing an information processor with a call processing unit to to perform the previously described the method. In the alternative, or in combination such information processing resources, one or more steps of the above-described processing may be undertaken by a discrete logic and/or circuitry, including application specific integrated circuits and/or analogous devices. The scope of the present invention should, therefore, be determined only by the following claims.

What is claimed is:

1. A call processing unit capable of supporting a plurality of call classes, comprising:
   a resource utilization unit to obtain first and second load parameters for the call processing unit;
   a first fuzzifier coupled to said resource utilization unit to fuzzify the first load parameter according to a first fuzzification function;
   a second fuzzifier coupled to said resource utilization unit to fuzzify the second load parameter according to a second fuzzification function; and
   a load balancing fuzzy logic unit, comprising;
   a rules inference engine coupled to said first and second fuzzifiers to compare the fuzzified first and second load parameters against a defined set of eagerness rules;
   a defuzzification unit responsive to said rules inference engine to defuzzify a result of comparison between the fuzzified load parameters and the defined set of eagerness rules;
   a generation unit responsive to said defuzzification unit to generate the eagerness to admit a call based on the defuzzification result;
   a homogeneousness realization unit coupled to said resource utilization unit to realize a homogeneousness parameter based on the second load parameter;
   a third fuzzifier coupled to said homogeneousness realization unit to fuzzify the homogeneousness parameter according to a third fuzzification function;
   wherein said rules inference engine is further coupled to said third fuzzifier to compare the fuzzified homogeneousness parameter with the fuzzified first and second load parameters against the defined set of eagerness rules; and
   wherein said defuzzification unit defuzzifies a result of comparison between the fuzzified load parameters, the fuzzified homogeneousness parameter and the defined set of eagerness rules.

2. A call processing system, comprising:
   an individual call processing unit, comprising the call processing unit capable of supporting a plurality of call classes, the call processing unit comprising:
   a resource utilization unit to obtain first and second load parameters for the call processing unit;

a first fuzzifier coupled to said resource utilization unit to fuzzify the first load parameter according to a first fuzzification function;

a second fuzzifier coupled to said resource utilization unit to fuzzify the second load parameter according to a second fuzzification function; and a load balancing fuzzy logic unit, comprising:

a rules inference engine coupled to said first and second fuzzifiers to compare the fuzzified first and second load parameters against a defined set of eagerness rules;

a defuzzification unit responsive to said rules inference engine to defuzzify a result of comparison between the fuzzified load parameters and the defined set of eagerness rules; and a generation unit responsive to said defuzzification unit to generate the eagerness to admit a call based on the defuzzification result, wherein said generation unit to generate the eagerness as a load eagerness for the individual call processing unit; and a managing call processing unit comprising:

a homogeneousness realization unit communicatively coupled to said resource utilization unit of said individual call processing unit to realize a homogeneousness parameter based on the second load parameter; and load balancing logic responsive to said generation unit and said homogeneousness realization unit, said load balancing logic to derive a call admission eagerness for the individual call processing unit based on the load eagerness and the homogeneousness parameter.

* * * * *